(12) United States Patent
Rahimi et al.

(10) Patent No.: US 11,184,164 B2
(45) Date of Patent: Nov. 23, 2021

(54) SECURE CRYPTO SYSTEM ATTRIBUTES

(71) Applicant: Microsoft Technology Licensing, LLC, Redmond, WA (US)

(72) Inventors: Kambiz Rahimi, Kirkland, WA (US); Jay Scott Fuller, Scotts Valley, CA (US); Ling Tony Chen, Bellevue, WA (US); Felix Stefan Domke, Luebeck (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 511 days.

(21) Appl. No.: 15/887,800

(22) Filed: Feb. 2, 2018

(65) Prior Publication Data
US 2019/0245686 A1 Aug. 8, 2019

(51) Int. Cl.
*H04L 9/08* (2006.01)
*G06F 21/72* (2013.01)
*G06F 21/86* (2013.01)
*H04L 9/06* (2006.01)

(52) U.S. Cl.
CPC ............ *H04L 9/0861* (2013.01); *G06F 21/72* (2013.01); *G06F 21/86* (2013.01); *H04L 9/0643* (2013.01); *H04L 9/0894* (2013.01); *H04L 2209/12* (2013.01)

(58) Field of Classification Search
CPC ... H04L 9/0643; H04L 9/0861; H04L 9/0894; H04L 2209/12; G06F 21/72; G06F 21/86
See application file for complete search history.

(56) References Cited

U.S. PATENT DOCUMENTS

| 6,704,871 | B1 | 3/2004 | Kaplan et al. | |
| 6,810,259 | B1* | 10/2004 | Zhang | H04W 8/18 455/435.1 |
| 6,959,086 | B2* | 10/2005 | Ober | G06F 8/60 380/259 |
| 7,209,563 | B1* | 4/2007 | Calvez | H04L 9/0836 380/277 |
| 7,492,763 | B1* | 2/2009 | Alexander, Jr. | H04L 49/351 370/389 |
| 7,921,303 | B2 | 4/2011 | Mauro, II | |
| 8,031,709 | B2* | 10/2011 | Alexander, Jr. | H04L 47/10 370/389 |

(Continued)

OTHER PUBLICATIONS

"International Search Report and Written Opinion Issued in PCT Application No. PCT/US19/013892", dated Apr. 26, 2019, 11 Pages.

(Continued)

*Primary Examiner* — Linglan E Edwards
(74) *Attorney, Agent, or Firm* — Alleman Hall Creasman & Tuttle LLP

(57) ABSTRACT

Disclosed is a cryptographic key management system implemented in access and tamper resistant circuitry. The circuitry includes processing circuitry to perform cryptographic processing based cryptographic keys. Cryptographic key registers include key portions and attribute portions. An interface receives commands from exposed circuitry that controls the processing circuitry to perform cryptographic processing based on the keys and associated attributes. The attributes indicate what operations may be performed on, or using, the associated keys. of the associated keys. The attributes indicate intended uses of the keys.

20 Claims, 18 Drawing Sheets

(56) References Cited

U.S. PATENT DOCUMENTS

| | | | |
|---|---|---|---|
| 8,468,364 B2 | 6/2013 | Goto | |
| 8,938,627 B2 | 1/2015 | Oggioni et al. | |
| 9,419,794 B2* | 8/2016 | Polzin | H04L 9/0861 |
| 9,910,611 B2* | 3/2018 | Koufaty | G06F 3/0622 |
| 10,084,771 B2* | 9/2018 | Kocher | H04L 9/083 |
| 2002/0080958 A1* | 6/2002 | Ober | G06F 21/79 |
| | | | 380/44 |
| 2008/0205651 A1 | 8/2008 | Goto et al. | |
| 2014/0086406 A1* | 3/2014 | Polzin | H04L 9/0822 |
| | | | 380/44 |
| 2014/0136855 A1 | 5/2014 | Ducharme et al. | |
| 2014/0215202 A1* | 7/2014 | Paris | G06F 16/00 |
| | | | 713/100 |
| 2016/0350019 A1* | 12/2016 | Koufaty | G06F 12/08 |

OTHER PUBLICATIONS

"Android Keystore System", Retrieved From <<https://web.archive.org/web/20150831010219/https://developer.android.com/training/articles/keystore.html>>, Aug. 31, 2015, 12 Pages.

"Hardware Security Modules (HSMs)", Retrieved From <<https://web.archive.org/web/20170710072859/https://safenet.gemalto.com/data-encryption/hardware-security-modules-hsms/>>, Jul. 10, 2017, 5 Pages.

"Hardware-based Security", Retrieved From <<http://www.cs.cornell.edu/courses/cs5431/2017sp/Lec10-Hardware.pdf>>, May 5, 2017, 5 Pages.

"TPM Fundamentals", Retrieved From <<https://docs.microsoft.com/en-us/previous-versions/windows/it-pro/windows-8.1-and-8/jj889441(v=ws.11)>>, Oct. 27, 2013, 7 Pages.

"Trusted Computing Architecture", Retrieved From <<https://web.archive.org/web/20121130224736/https://crypto.stanford.edu/cs155old/cs155-spring11/lectures/08-TCG.pdf>>, Nov. 30, 2012, 37 Pages.

Dwoskin, et al., "Hardware-rooted Trust for Secure Key Management and Transient Trust", In Proceedings of the 14th ACM conference on Computer and communications security, Oct. 29, 2007, pp. 389-400.

Eisele, et al., "Introducing Hardware Security Modules to Embedded Systems", Retrieved From <<https://vector.com/portal/medien/cmc/events/Vector_EMOB_2017_Phanuel_Hieber.pdf>>, Mar. 17, 2017, 19 Pages.

Lich, et al., "How Windows 10 uses the Trusted Platform Module", Retrieved From <<https://docs.microsoft.com/en-us/windows/device-security/tpm/how-windows-uses-the-tpm>>, Oct. 27, 2017, 12 Pages.

* cited by examiner

SECURE CRYPTO SYSTEM ATTRIBUTES

BACKGROUND

A characteristic of modern computing devices is the opportunity for intentional security breaches. These breaches can lead to, for example, identity theft, software, movie, and song piracy, and the compromising of state secrets. These breaches may be accomplished via various and ever-evolving techniques. Often, these techniques involve the introduction of malicious software that subverts one or more security measures taken by the devices makers. Measures for preventing such breaches are therefore increasingly important.

SUMMARY

Examples discussed herein relate to a cryptographic key management system, that includes processing circuitry to perform cryptographic processing and a plurality of cryptographic key registers. The plurality of cryptographic key registers includes at least a first cryptographic key register. The plurality of cryptographic key registers each include a cryptographic key portion to store a cryptographic key and attribute portion to store attribute indicators that are associated with (and/or inseparable from), the corresponding cryptographic key stored in the cryptographic key portions. The first cryptographic key register includes a first cryptographic key portion to store the first cryptographic key and a first attribute portion to store a first set of attribute indicators associated with the first cryptographic key. An interface receives commands that control the processing circuitry to perform cryptographic processing based at least in part on the first cryptographic key and the first set of attribute indicators.

In another example, a cryptographic key management system includes an interface to receive commands, a plurality of cryptographic key registers, and cryptographic key processing circuitry. The commands control the cryptographic key processing circuitry to perform a set of operations on a set of cryptographic keys. The plurality of cryptographic key registers are readable and writable by the cryptographic key processing circuitry. The plurality of cryptographic key registers each include a cryptographic key portion to store a cryptographic key and an attribute portions to store corresponding attribute indicators that are associated with the cryptographic keys. The attribute indicators to determine a respective subset of operations that the cryptographic key processing circuitry is allowed to perform using the cryptographic keys stored in the corresponding cryptographic key portion.

In another example, a method for deriving a cryptographic key includes receiving a first cryptographic key and receiving an indicator of an intended use for a derived key. The derived key is generated based on the first cryptographic key and the indicator of the intended use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIGS. 2A-2J are notional diagrams of operations that may be securely performed by a cryptographic key management system with key attributes.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or included in an integrated circuit.

In an embodiment, a set of cryptographic keys and an associated set of attributes (key attributes) are stored within an access and tamper resistant (ATR) circuit block. Operations on these keys is provided only through a limited function hardware interface such that the key values themselves are never exposed outside of the ATR circuit block. In addition, the operations that can be performed on these keys is determined by the key attributes, and such operations can only be performed by the ATR circuit block. The key attributes can only be modified/set by the ATR block at key generation or derivation time—thereby preventing software access to the keys and limiting unintended usage or conversion of the keys (e.g., to a new use) via software.

Figure 1:
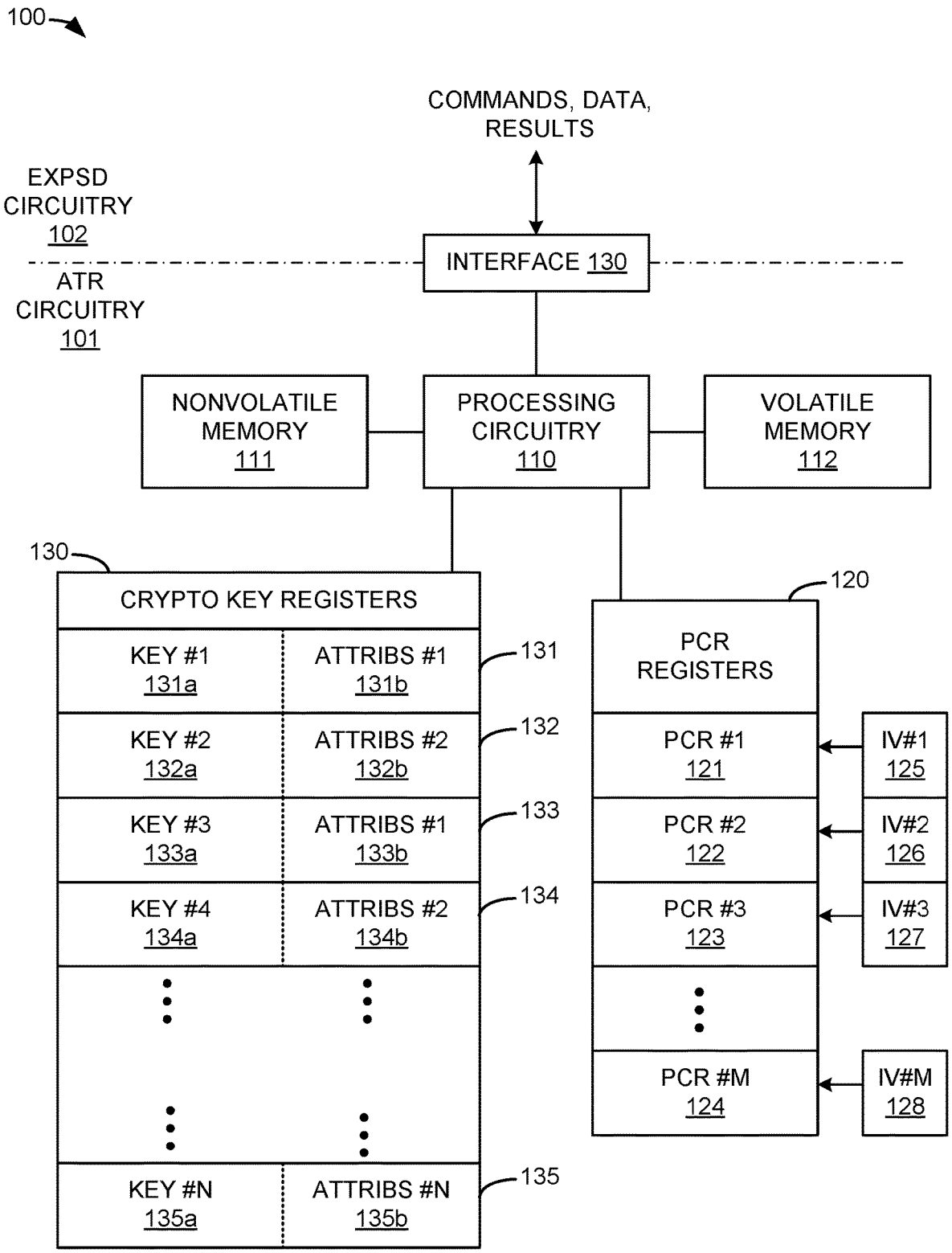
FIG. 1 is a block diagram of a cryptographic key management system with key attributes.

FIG. 1 is a block diagram of a cryptographic key management system with key attributes. In FIG. 1, cryptographic key management system 100 comprises access and tamper resistant (ATR) circuitry 101, exposed circuitry 102, and interface 130. Interface 130 in the only information bridge between exposed circuitry 102 and ATR circuitry 101. Thus, all access to pass commands, data, and/or results to or from ATC circuitry 101 passes through interface 130.

ATR circuitry 101 includes cryptographic processing circuitry 110, nonvolatile memory 111, volatile memory 112, cryptographic key registers 130, and platform configuration registers (PCRs) 120. Cryptographic key registers 130 includes N number of key registers 131-135, where N is an integer. PCRs 120 include M number of PCR registers 120-124, where M is an integer. Each key register 131-135 includes two portions: a key portion 131a-135a and an attribute portion 131b-135b, respectively. Each PCR register 121-124 is initialized to a unique, among other PCR registers 121-125, initial value 125-128, respectively.

ATR circuitry 101 uses key registers 130 to hold cryptographic keys in key portions 131a-135a and associated key attributes in attribute portions 131b-135b. PCRs 120 hold measurements. The N number of key registers 130, (a.k.a., key slots) and M number of PCRs 120 in ATR circuitry 101 is implementation defined. In an embodiment, a minimum of 16 key registers and 4 PCRs are defined. Each key portion 131a-135a may be, for example, 256 bits wide. Each attribute portion may be, for example, extra 24 bits wide. PCR registers 120 may be, for example, 256 bits wide. The key stored in a key register may be, for example, an Advanced Encryption Standard (AES) key (either 128, 192 or 256-bit), or an Elliptic-curve cryptography (ECC) private key (e.g., an ECC key that conforms to the NIST P-256—or other standardized/unstandardized ECC curves.) The type of key held in a key register 131-135 is specified by the values in its attribute portion 131b-135b. The values in the attribute portions 131b-135b also control what type of operation can be performed on, or by, the key stored in the associated key portion 131a-135a.

These operations include, for example, the ability to performing AES encryption/decryption using the stored key, the applying a Key Derivation Function (KDF) to the stored key to derive another stored key, and using the stored key to decrypt and "load" a cryptographic key blob containing a key and associated attribute into another key register 131-135. The combination of KDF and load operations, for example, enables a chain of cryptographic keys to be distributed. These operations enable, for example, the ability to distribute keys from servers (such as Xbox LIVE™) to client devices including cryptographic key management system 100. These distributed keys may be used, for example, to decrypt games, music, movies, etc., as well as other useful applications, without exposing the unencrypted version of these key outside of ATC circuitry 101.

In an embodiment, attribute portions 131b-135b of key registers 130 are 24 bits wide. The values in attribute portions (a.k.a. attribute fields) 131b-135b define the operations that processing circuitry 110 can perform on, or using, the key stored in the associated key portion (a.k.a. key field) 131a-135a. Processing circuitry 110 maintains the association between the key and its associated attributes such that the attributes follow the key and are not changed outside of ATR circuitry 101. Accordingly, the rules for setting the attributes is enforced by ATR circuitry 101. In an embodiment, however, attribute values may be read by exposed circuitry, via interface 130, in unencrypted form.

ATR circuitry 101, and processing circuitry 110, in particular, may perform various cryptographic operations using keys stored in key portions 131a-135a and corresponding attributes stored in attribute portions 131b-135b. Some example operations are notionally illustrated in FIG. 2A-2G. In FIGS. 2A-2G, ATR circuitry 201 includes key register 231. Key register 231 includes key portion 231a and attribute portion 231b. Attribute portion 231b comprises N bits of storage 231b-1 to 231b-6. Processing circuitry 210 may access and read key portion 231a to read and write a key 250. Processing circuitry 210 may access and attribute portion 231 to read and write one or more attributes (a.k.a., attribute indicators) 240.

Figure 2A:
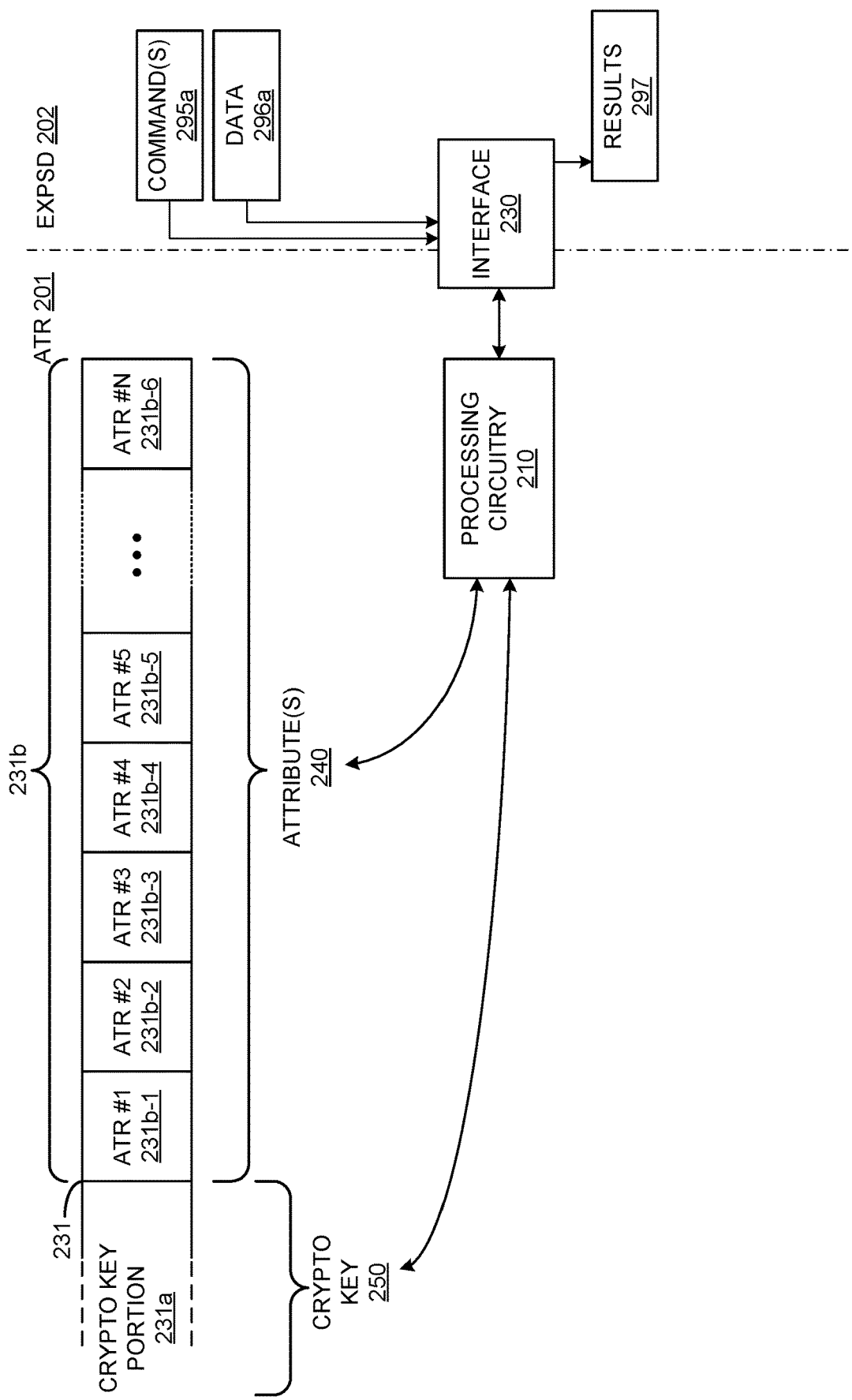

As illustrated notionally in FIG. 2A, exposed circuitry 202 may provide one or more commands 295a (a.k.a., instructions) and/or data 296a to interface 230. Interface 230 may provide the one or more commands 296a and/or data 296a to processing circuit 210 of ATR circuitry 201. Processing circuitry 210 may, based on one or more commands 295a and/or data 296a received from exposed circuitry 202 perform cryptographic operations based (at least in part) on key 250 and attributes 240. Processing circuitry may also provide the results (e.g., success, fail, encrypted cryptographic key blob, etc.) of commands 295a to exposed circuitry 202 via interface 230.

Figure 2B:
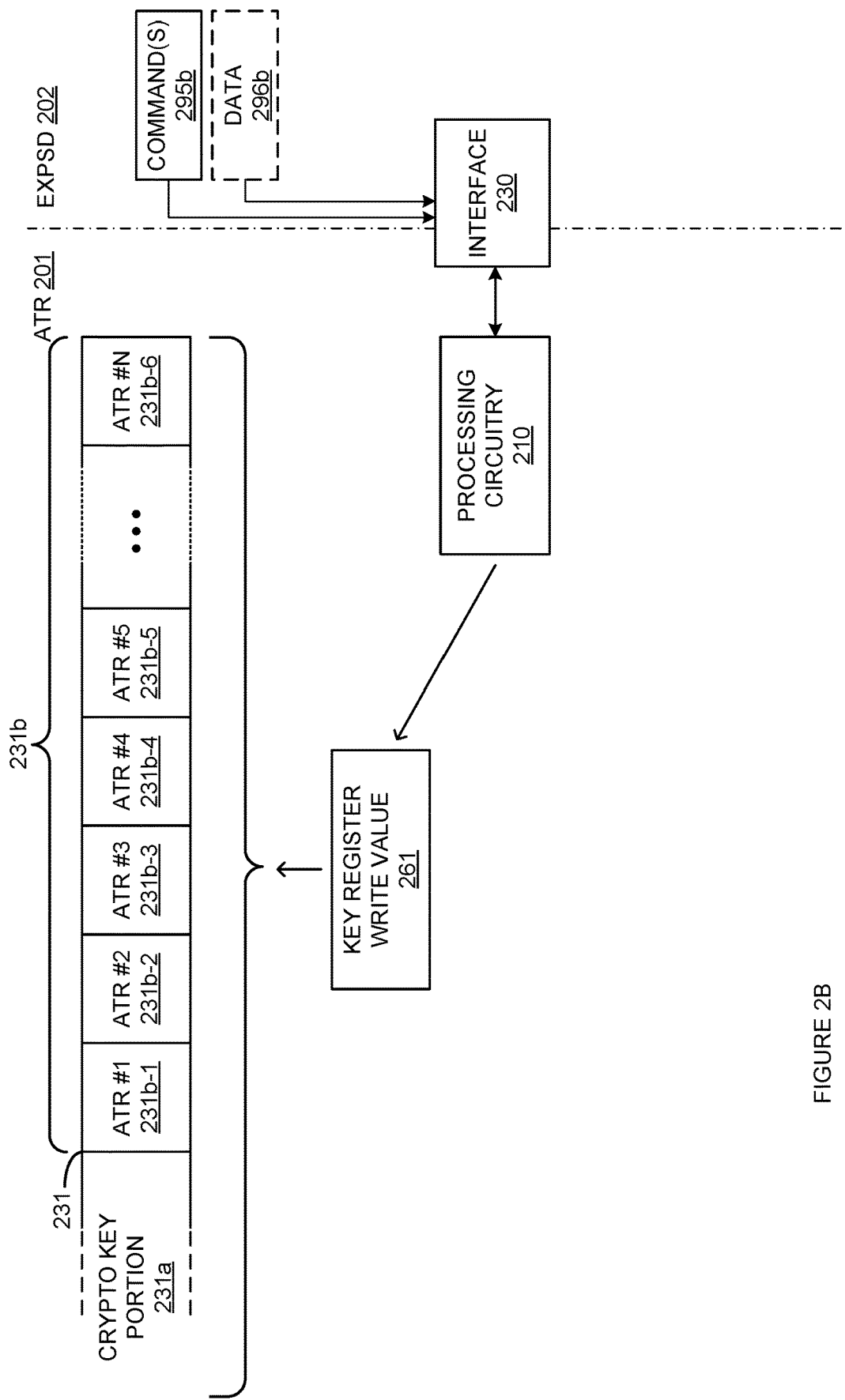

In an embodiment, the key portions 131a-135a of key registers 130 are not writable in response to commands received via interface 130 without also writing the corresponding attribute portion. This is illustrated notionally in FIG. 2B. In FIG. 2B, one or more commands 295a (and optionally associated data 296b) is provided to interface 230 for provision to processing circuitry 210. In response, processing circuitry 210 creates key register write value 261. Key register write value 261, which includes both a key value and a complete set of associated attributes is written to key register 231.

Figure 2C:
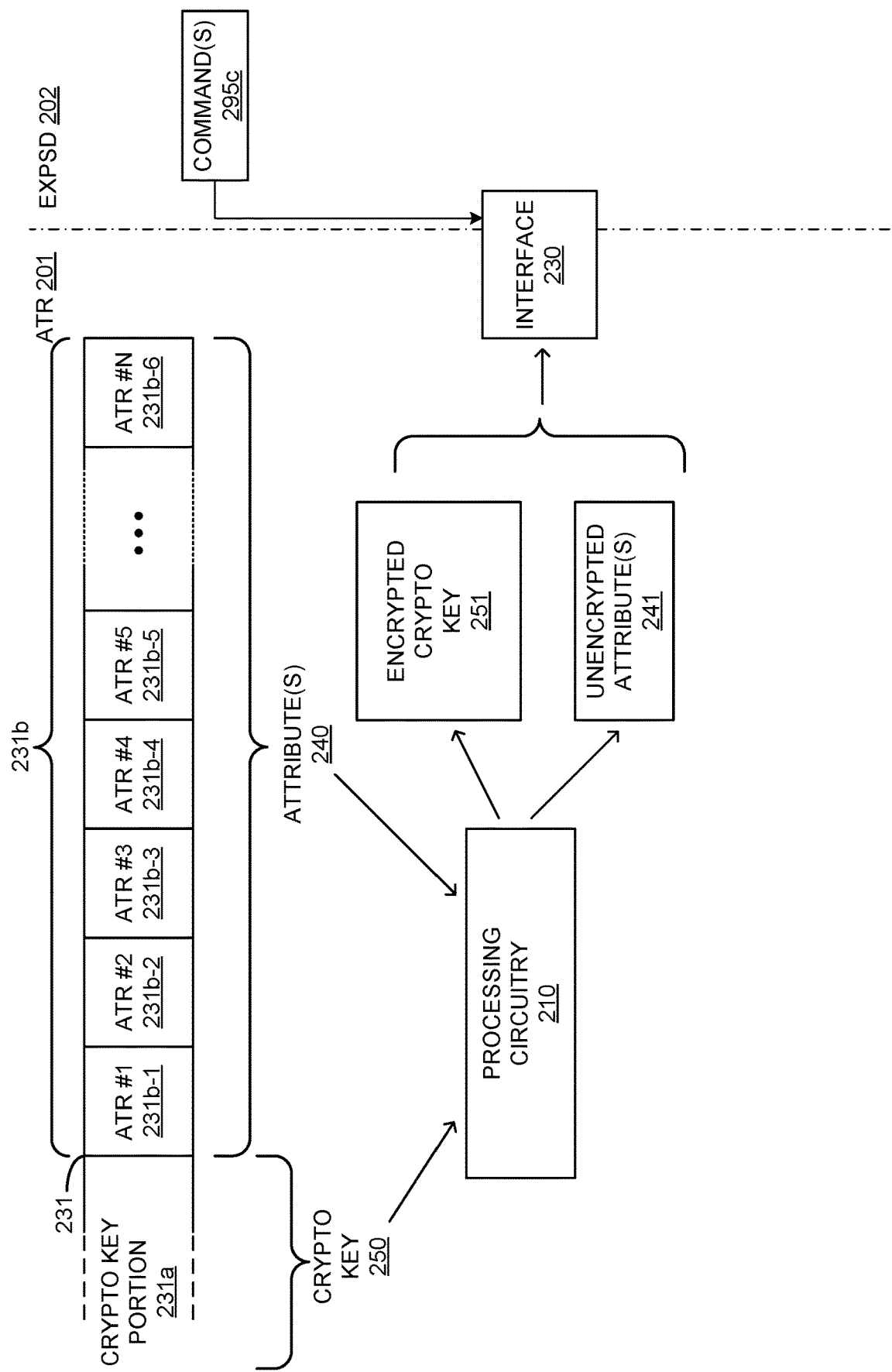

In an embodiment, the key portions of 131a-135a of key registers 130 are not readable, in response to commands received via interface 130, in unencrypted form. However, the attribute portions 131b-135b of the cryptographic key registers 130 are readable, in unencrypted form, via interface 130 in response to commands received via the interface. This is illustrated notionally in FIG. 2C. In FIG. 2C, one or more commands 295c are provided to interface 230 for provision to processing circuitry 210. In response, processing circuitry 210 read key 250 and attributes 240 from key register 231. Processing circuitry 210 may provide an encrypted form 251 of cryptographic key 250 to interface 230 for provision to exposed circuitry 202. In an embodiment, encrypted form 251 may be generated by encrypting key 250 with some other key that is unique to this ATR 201. In another embodiment, encrypted form 251 may be generated by encrypting key 250 along with attributes 240 and/or other information (e.g., a salt value.) The encryption key for generating encrypted form 251 may be obtained from a key register (e.g., one of key registers 131-135.) Processing circuitry 210 may provide unencrypted form of attribute 240 to interface 230 for provision to exposed circuitry 202. Note that the key used to encrypt 250 should be unique to ATR 201 and not available to exposed circuitry 202. If the key was set by exposed circuitry 202 and available to exposed circuitry 202, then exposed circuitry 202 would be able to decrypt 251 back to 250 which defeats the ability to keep keys in ATR 201 secret.

Figure 2D:
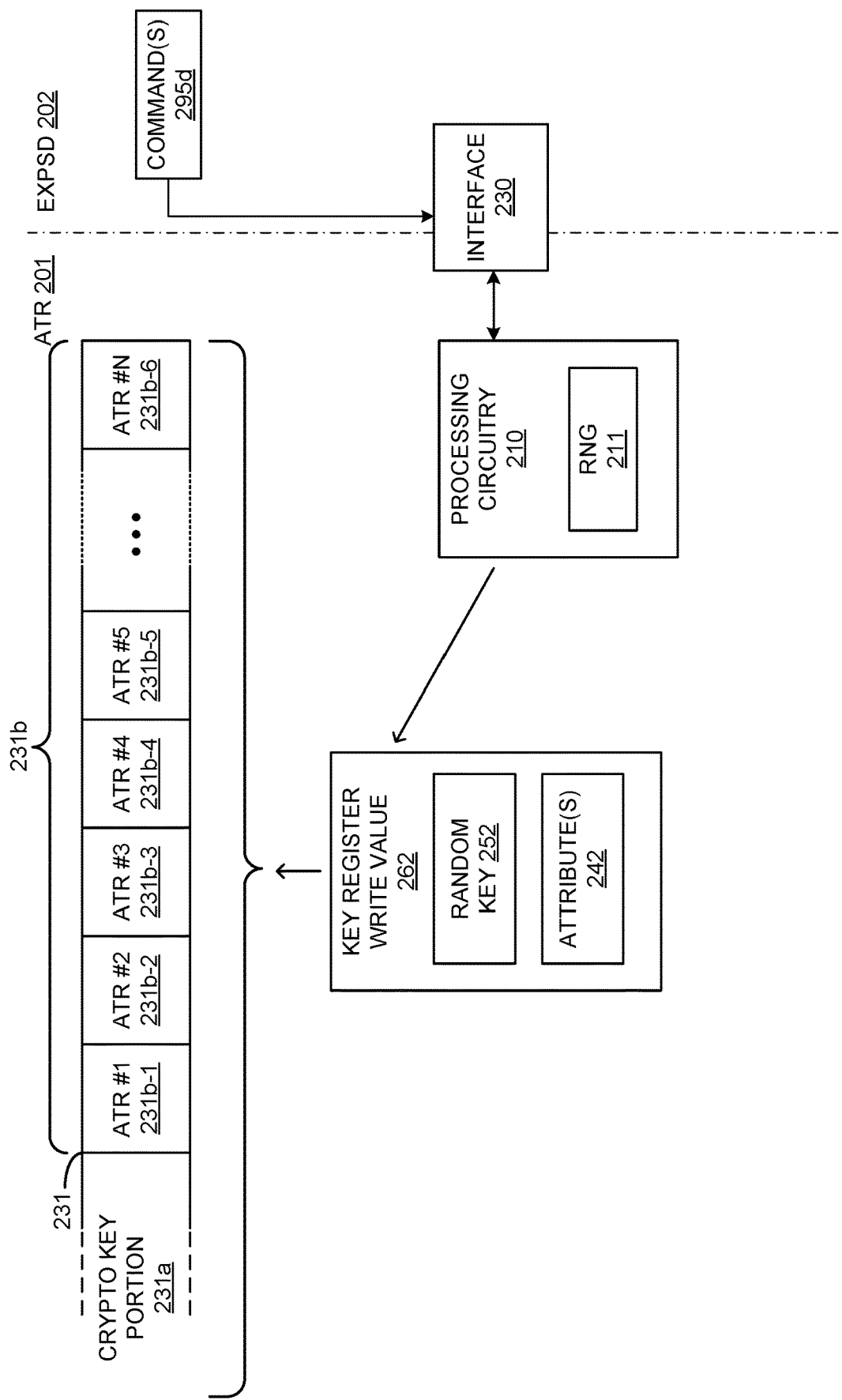

In an embodiment, based on one or more commands received via interface 130, a randomly generated cryptographic key and an associated set of attributes may be written to a cryptographic key register 131-135 where the randomly generated cryptographic key is generated by processing circuitry 110. This is illustrated notionally in FIG. 2D. In FIG. 2D, one or more commands 295d are provided to interface 230 for provision to processing circuitry 210. In response, processing circuitry 210 creates a random key 252 using random number generator circuitry 211. Random key 252 and an associated set of attributes 242 (e.g., provided at least in part by a command 295d) are combined into a key register write value 262 that is written to key register 231.

Figure 2E:
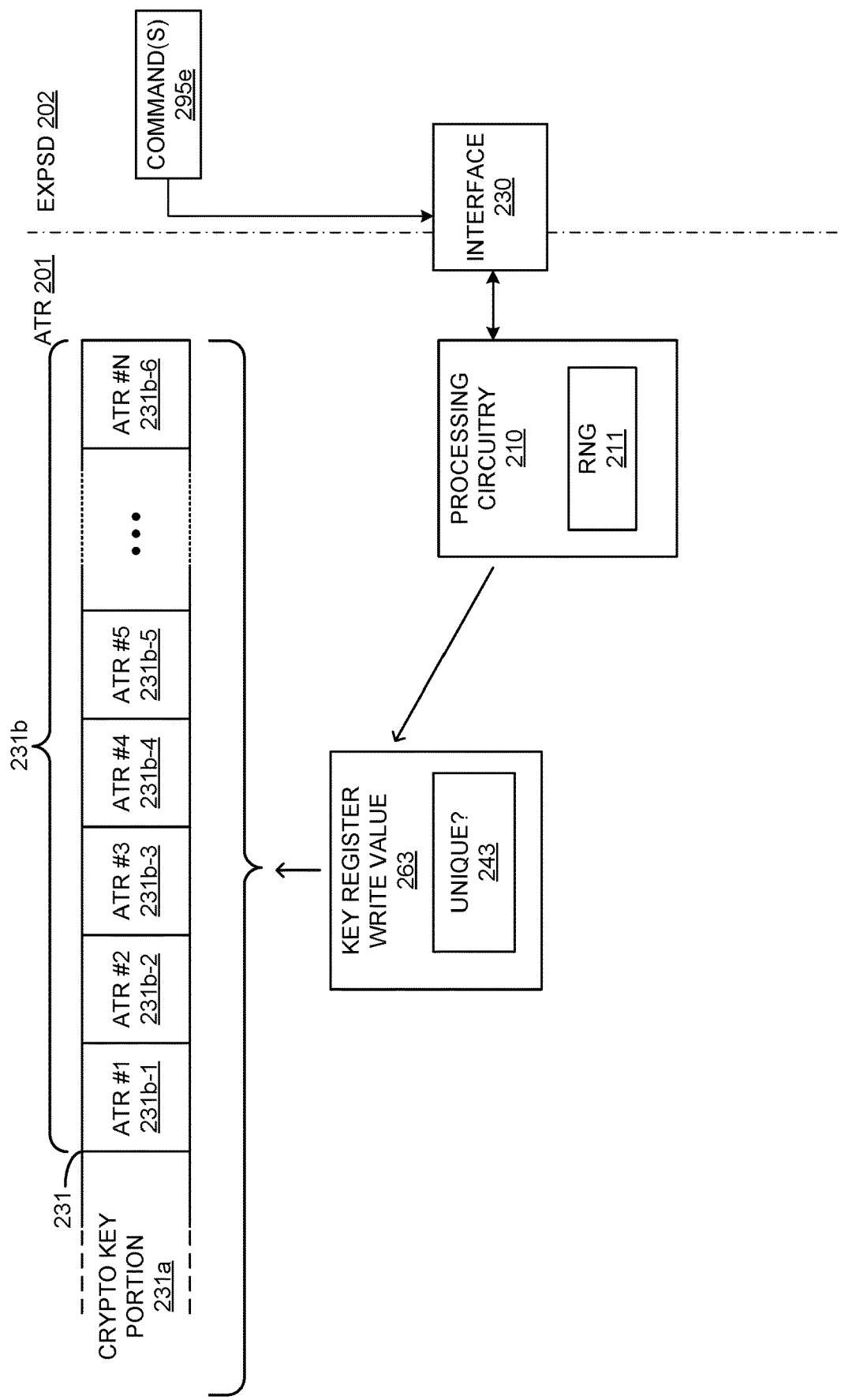

In an embodiment, based on one or more commands received via interface 130, a randomly generated cryptographic key having an attribute that indicates the randomly generated cryptographic key is statistically unique among other cryptographic key management systems may be written to a cryptographic key register 131-135. This is illustrated notionally in FIG. 2E. In FIG. 2E, one or more commands 295e are provided to interface 230 for provision to processing circuitry 210. In response, processing circuitry 210 creates a random key 252 using random number generator circuitry 211 and may set one or more attributes to indicate the key is unique. Random key 252 and the unique attribute indicator 243 are combined into a key register write value 263 that is written to key register 231. The statistical uniqueness of key 252 does not guarantee absolute uniqueness. However, because key 252 is based on very large pool of potential key values (e.g., $2^{256}$ possible values), chances of two keys having the same value is very small thus making each key, for practical purposes, unique. In an embodiment, generated random keys (e.g., key 252) may be only known within the hardware instance of ATR 101 that generated them and never outside (e.g., by exposed circuitry 102.)

Figure 2F:
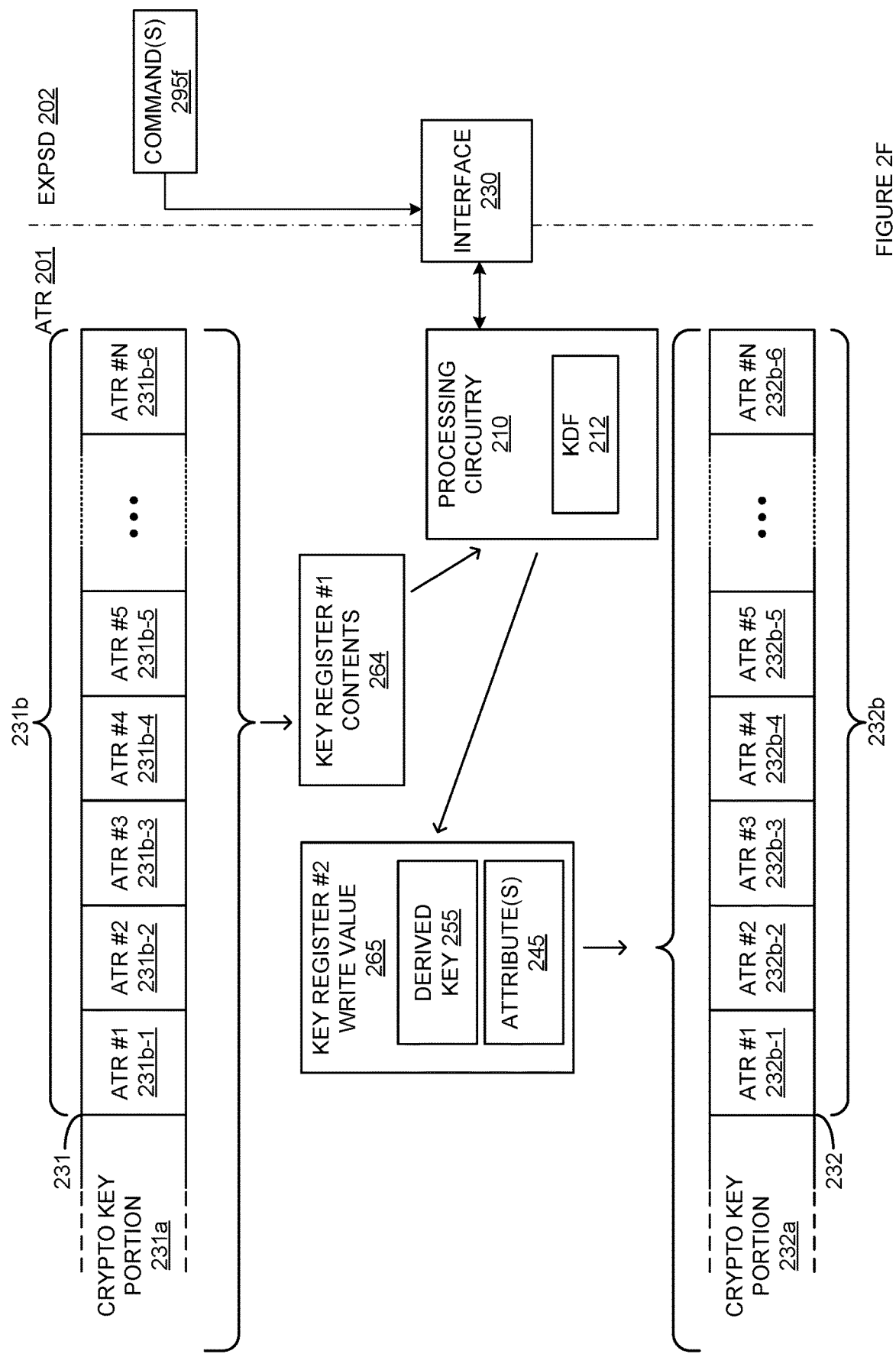

In an embodiment, based on one or more commands received via interface 130, a derived cryptographic key and an associated set of attributes are written to a cryptographic key register (e.g., key register 132) where the derived cryptographic key is generated by the processing circuitry 110 based at least in part on a first cryptographic key stored in another cryptographic key register (e.g., key register 131). This is illustrated notionally in FIG. 2F. In FIG. 2F, one or more commands 295f are provided to interface 230 for provision to processing circuitry 210. In response, processing circuitry 210 reads the contents 264 (both key and attribute portions) of key register 231. Processing circuitry 210 then, based on contents 264 (e.g., key portion 231a alone, or key portion 231a along with attribute portion 231b) derives a key 255 using key derivation function circuitry 212. Key derivation circuitry 212 may derive key 255 based on key portion 231a and new attributes 245. Derived key 255 and its associated set of attributes 245 are combined into a key register write value 265 that is written to key register 232. In an embodiment, the attributes 245 that are associated with derived key 255 are based at least in part on the attributes from contents 264. In an embodiment, the attributes 245 that are associated with derived key 255 are based at least in part on attributes provided by a command 295f. In an embodiment, one or more indicators from attribute portion 231b may determine whether processing circuitry 210 will perform the key derivation operation specified by command 295f.

Figure 2G:
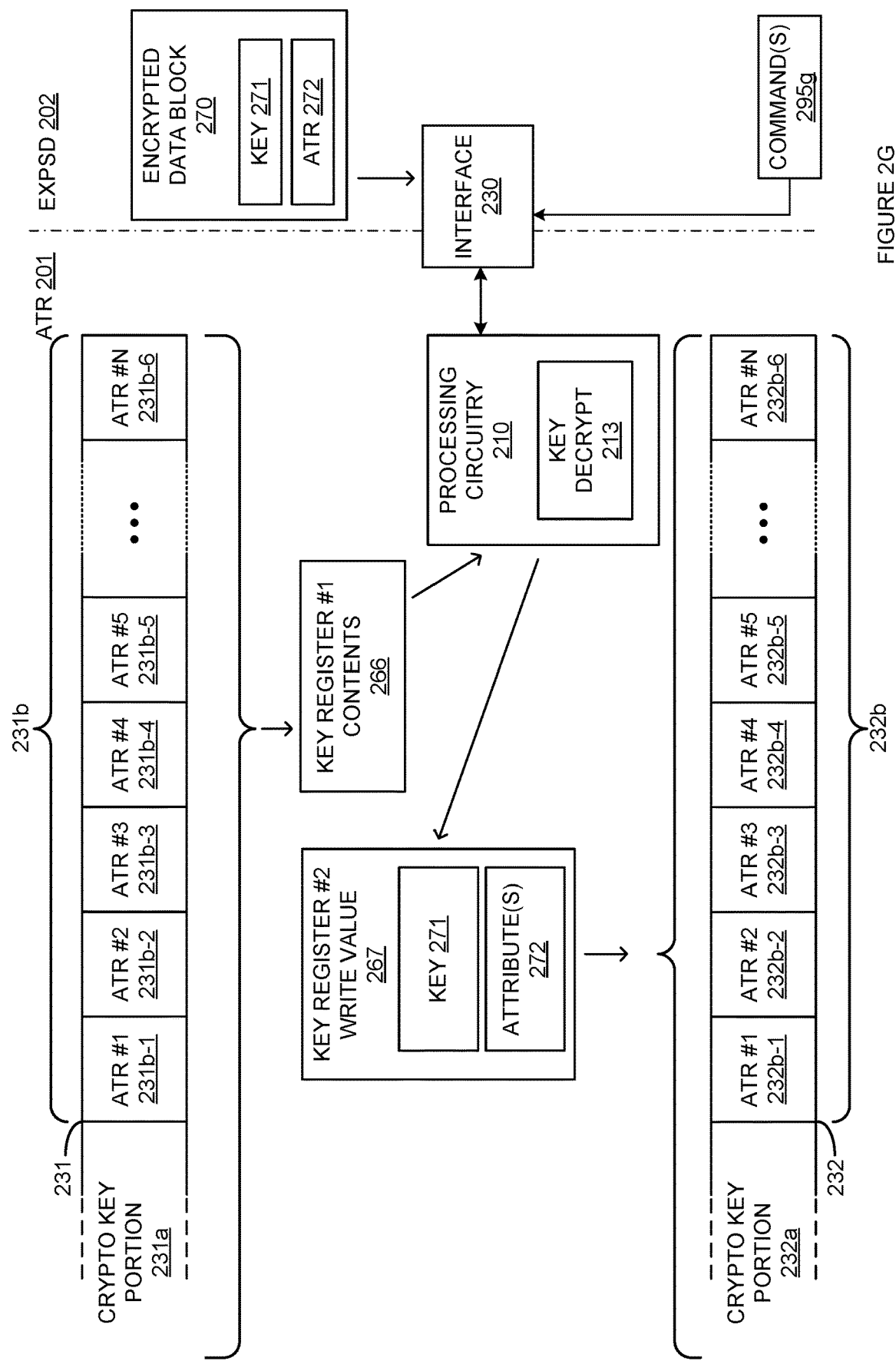

In an embodiment, based on one or more commands received via interface 130, a cryptographic key and associated set of attributes from an encrypted cryptographic data block are decrypted using a cryptographic key stored in a cryptographic register (e.g., key register 131) and written to another (or the same) key register (e.g., key register 132). This is illustrated notionally in FIG. 2G. In FIG. 2G, one or more commands 295g and an encrypted cryptographic data block 270 are provided to interface 230 for provision to processing circuitry 210. Encrypted cryptographic data block 270 includes an encrypted version of cryptographic key 271 and attributes 272. In response to command(s) 295g, processing circuitry 210 reads the contents 266 (both key and attribute portions) of key register 231. Processing circuitry 210 then, based on contents 266 (e.g., key portion 231a alone, or key portion 231a along with attribute portion 231b) decrypts encrypted data block 270 using key decryption circuitry 213. Key decryption circuitry provides unencrypted key 271 and unencrypted attributes 272 to processing circuitry 210. Key 271 and its associated set of attributes 272 are combined into a key register write value 267 that is written to key register 232. In an embodiment, processing circuitry 210 ensures that the attributes 272, as written to key register 232, cannot specify that key 271 is unique among other cryptographic key management systems. Processing circuitry 210 may ensure that the attributes 272, as written to key register 232, do not specify that key 271 is unique among other cryptographic key management systems based on key 271 being provided from exposed circuitry 202 (as opposed to being internally generated by ATR circuitry 201.) In an embodiment, one or more indicators from attribute portion 231b may determine whether processing circuitry 210 will perform the key derivation operation specified by command 295g.

ATR circuitry 101 includes PCRs 120. The values stored in PCRs 120 are generated by circuity internal to ATR circuitry 201 in response to command received via interface 132. These internally generated PCR values stored in PCRs 120 are readable via interface 130 in response to commands received via interface 130. However, the values stored in PCRs 120 are not writable with values received via interface 130 (i.e., values from exposed circuitry 202.) This is illustrated notionally in FIG. 2H and FIG. 2I.

Figure 2H:
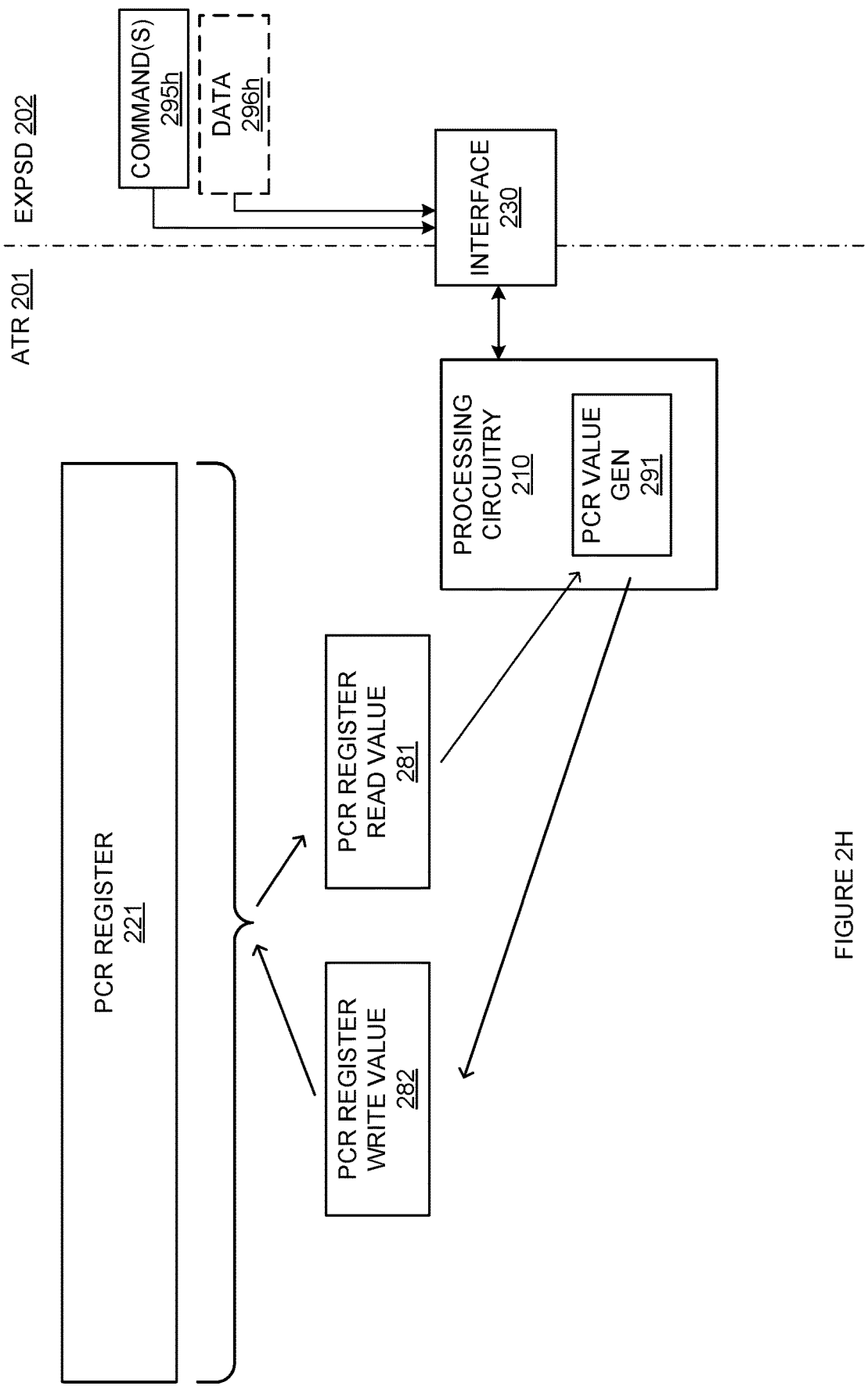
Figure 21:
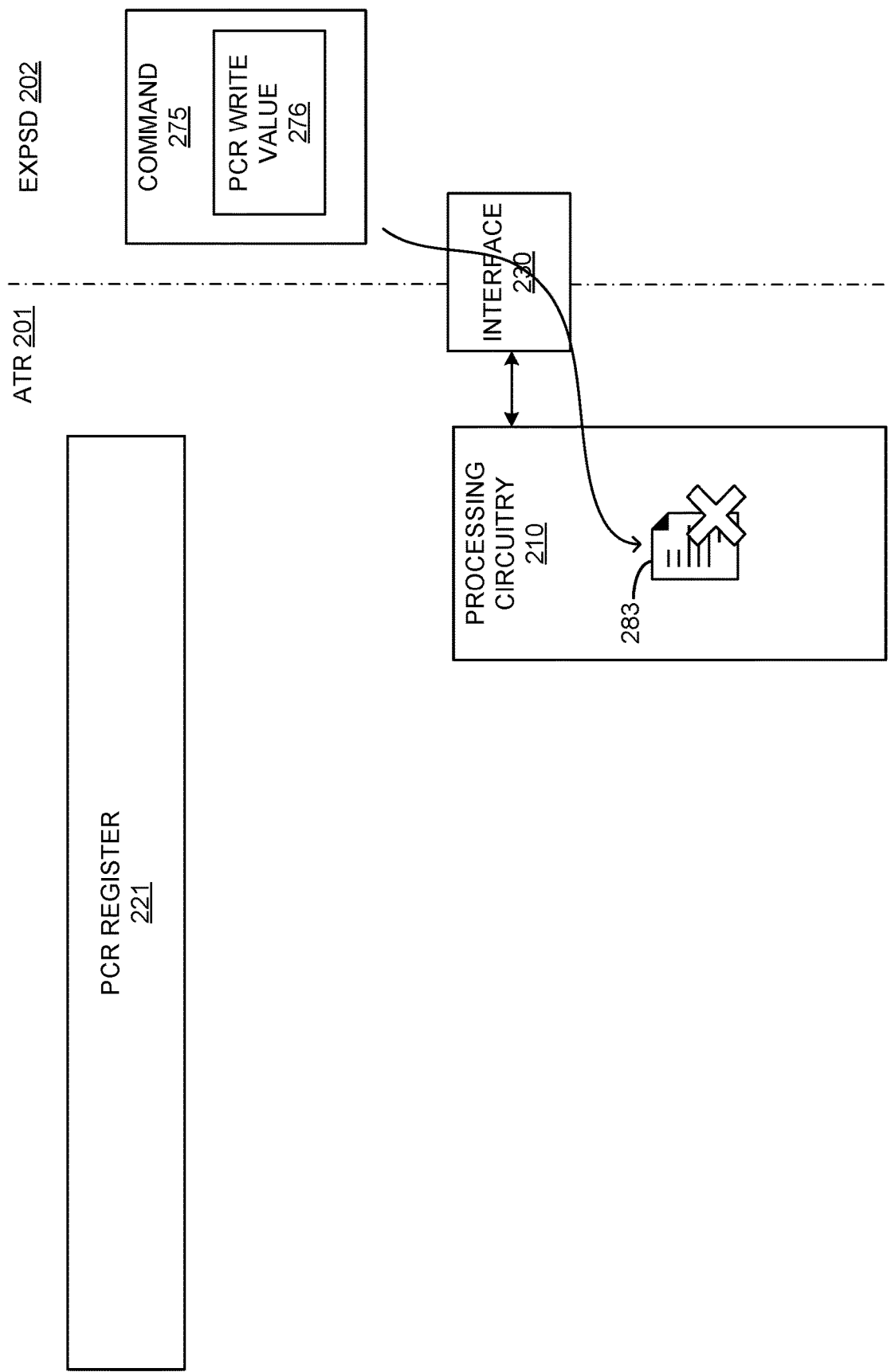

In FIG. 2H, one or more commands 295h (and associated data 296h—e.g., an extend value) are provided to interface 230 for provision to processing circuitry 210. In response, processing circuitry 210 reads the contents 281 of PCR register 221. Using PCR value generation circuitry 291, processing circuitry generates a new PCR value 282 based on the value 281 read from PCR register 221 and optionally also based on data 296h received via interface 230. In an embodiment, PCR value generation circuitry 291 generates the new value 282 to be written to PCR 221 using a Secure Hash Algorithm (e.g., SHA-1, SHA-2, etc.) PCR value generation circuitry 291 may generates the new value 282 to be written to PCR 221 by hashing a concatenation of the current value 281 of PCR 221 and data 296h. The new value 282 is written to PCR 221. In an embodiment, one or more indicators from attribute portion 231b may determine whether processing circuitry 210 will perform the key derivation operation specified by command 295h.

In FIG. 2I, one or more commands 275 are provided to interface 230 for provision to processing circuitry 210 in an attempt to write a value 276 to PCR 221. Processing circuitry 210 blocks this attempt (illustrated by 283).

Figure 2J:
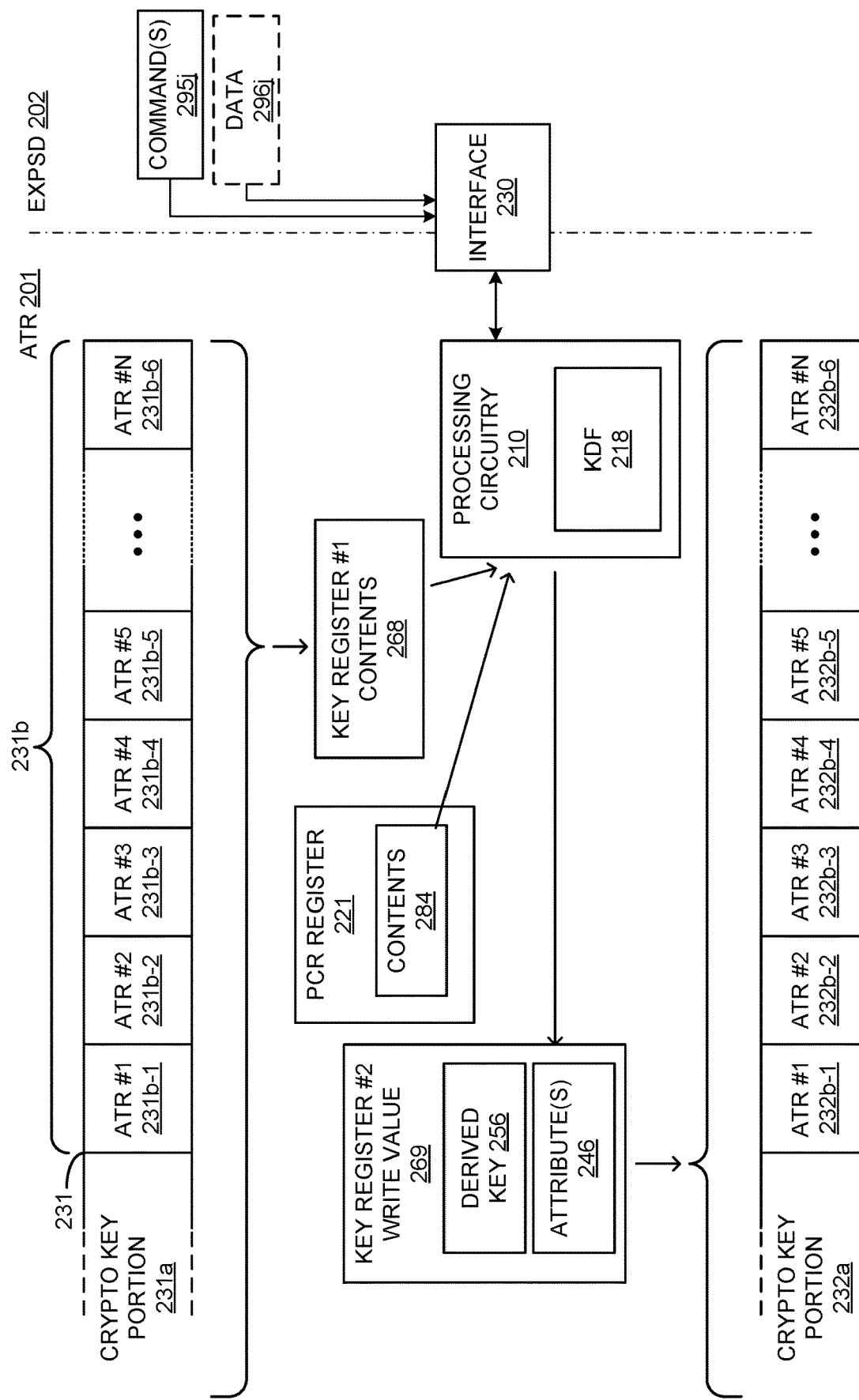

In an embodiment, based on one or more commands received via interface 130, a derived cryptographic key and an associated set of attributes are written to a cryptographic key register (e.g., key register 132) where the derived cryptographic key is generated by the processing circuitry 110 based at least in part on a first cryptographic key stored in another cryptographic key register (e.g., key register 131) and based on a value in a platform configuration register (e.g., PCR 121). This is illustrated notionally in FIG. 2J. In FIG. 2J, one or more commands 295j (and optionally data 296j) are provided to interface 230 for provision to processing circuitry 210. In response, processing circuitry 210 reads the contents 268 (both key and attribute portions) of key register 231. Processing circuitry 210 also reads the contents 284 of PCR register 221. Processing circuitry 210 then, based on contents 284 (e.g., key portion 231a alone, or key portion 231a along with attribute portion 231b) and contents 284, derives a key 256 using key derivation function circuitry 218. In an embodiment, key derivation circuitry 218 may derive key 256 based on contents 284 along with contents 268 alone (e.g., key portion 231a alone, or key portion 231a along with attribute portion 231b). In another embodiment, key derivation circuitry 218 may derive key 256 based on contents 284 along with contents 268 (e.g., key portion 231a alone, or key portion 231a along with attribute portion 231b) and new attributes 246. Derived key 256 and its associated set of attributes 246 are combined into a key register write value 269 that is written to key register 232. In an embodiment, the attributes 246 that are associated with derived key 255 are based at least in part on the attributes from contents 268. In an embodiment, one or more indicators from attribute portion 231b may determine whether processing circuitry 210 will perform the key derivation operation specified by command 295*h*.

The following gives a set of example operations that may be performed by ATR circuitry 101:

Extend a value into a PCR register. Input: PCR identifier. Notes: The new PCR register value is a SHA of the concatenation of the current PCR value with the input value.

Set a value into a key register with associated attributes. Inputs: destination key register identifier, key value, attributes. Notes: Modifies the provided attributes to indicate the key is not a device specific secret key.

Generate a random key. Input: destination key register identifier, attributes. Notes: allows attributes to indicate the generated random key is a device specific secret key. If attributes indicate the key can be used with particular crypto scheme (e.g., AES, ECC, etc.) the generated key is made to be compatible with indicated scheme.

Send a key to hardware accelerator. Inputs: destination key register identifier, identifier of destination at accelerator. Notes: operation should send the key through a private hardware channel (not shown in FIG. 1) to another silicon based crypto accelerator on the same die (not shown in FIG. 1—e.g. SCP). Both the key, and the attributes are sent over the private key interface. This operation is only performed if attributes indicate this operation is allowed for this key.

Load a key from an encrypted key data block. Inputs: destination key register identifier, decryption key register identifier, encrypted data block. Notes: Takes an encrypted data block containing a key, attributes associated with the key, and an integrity tag value, and decrypts and verifies it. If the integrity check passes, the decrypted key and its attributes are loaded into the destination key register. If the key used to encrypt the encrypted data block does not match the key used to decrypt the data block, or if there is corruption of the encrypted data block, the integrity check (which is performed based on the integrity tag value) should fail. An example key wrapping function may be the authenticated AES key wrap function described in NIST SP 800-38F. This operation is only performed if the attributes indicate this operation is allowed for this key. This operation allows the attributes to indicate the key is a device specific secret key only if attributes from both the data block and decryption key register indicate they are device specific secret keys.

Generate an encrypted key data block from provided key and attributes. Inputs: key value to place in encrypted data block, attributes to place in data block, encryption key register identifier. Output: an encrypted data block with key, attributes, and integrity check information. Notes: takes a key value, and associated attributes as input. Uses the encryption key register to provide an encryption key to encrypt the key value and attributes. Also adds an integrity tag value to the data block so that the key and attributes can be loaded in the future. A future "load a key from an encrypted key data block" operation will only succeed if the key in the decryption register has the same as the value in the encryption key register when this operation was performed. This operation is only performed if the attributes of encryption key indicate this operation is allowed for the encryption key. This operation modifies the attributes placed in data block to indicate that the key in data block is not a device specific secret key.

Generate an encrypted key data block from key register. Inputs: identifier of key register to place in encrypted data block, encryption key register identifier. Output: an encrypted data block with key, attributes, and integrity check information. Notes: takes a key value, and associated attributes from a key register as input. Uses the encryption key register to provide an encryption key to encrypt the key value and attributes. Also adds an integrity tag value to the data block so that the key and attributes can be loaded in the future. A future "load a key from an encrypted key data block" operation will only succeed if the key in the decryption register has the same as the value in the encryption key register when this operation was performed. This operation will only be performed if the encryption key slot has attributes that indicate the encryption key is a device specific secret key. If this was not enforced, then malicious software could just use an operation that generates a key to create a well-known key and then use this operation to save that key with attributes that indicate that key to be a device specific secret key using the non-secret encryption source key. Software could then be used to deduce the value of the saved key since the source key value is known. This operation is only performed if the attributes of encryption key indicate this operation is allowed for the encryption key. This operation is only performed if the attributes of the encryption key indicate the encryption key may be used to generate encrypted data blocks and the encryption key attributes also indicate that the encryption key is a device specific secret key.

Derive a key from a key. Inputs: source key register identifier, destination key register identifier, input value, attributes. A SHA based KDF function is applied to the key in the source key slot, the input value, and attributes to derive a new key. The new key along with the attributes are stored in the destination key slot. Notes: A SHA based key derivation function (KDF) is applied to the key in the source key slot, the input value, and the attributes to derive a new key. The new key along with the attributes are stored in the destination key slot. This operation is only performed if attributes in the source key register indicate this operation is allowed for the source key. The attributes written to the destination key register may only indicate that the new key is a device specific secret key if the source key register attributes indicated the source key was a device specific secret key. If the destination attributes indicate the key can be used with particular cryptographic scheme (e.g., AES, ECC, etc.) the generated key is made to be compatible with indicated scheme.

Derive a key from a PCR value. Inputs: source key register identifier, destination key register identifier, PCR register identifier, attributes. Notes: A SHA based key derivation function (should be different from KDF function used for "Derive a key from a key") is applied to the key in the source key slot, the value in the specified PCR, and the attributes to derive a new key. The new key along with the attributes are stored in the destination key slot. This operation is only performed if attributes in the source key register indicate this operation is allowed for the source key. The attributes written to the destination key register may only indicate that the new key is a device specific secret key if the source key register attributes indicated the source key was a device specific secret key. If the destination attributes indicate the key can be used with particular cryptographic scheme (e.g., AES, ECC, etc.) the generated key is made to be compatible with indicated scheme.

Derive a storable key from a PCR value. Inputs: source key register identifier, destination key register identifier, PCR register identifier, attributes. Notes: A SHA based key derivation function (should be the same KDF function used for "Derive a key from a PCR value") is applied to the key in the source key slot, the value in the specified PCR, and the attributes to derive a new key. The new key along with the attributes are stored in the destination key slot. However, the attributes are modified such that the "Load a key from an encrypted key data block" operation on the derived key is not allowed. Whether the derived key may be stored is specified by the input attributes. This operation is only performed if attributes in the source key register indicate this operation is allowed for the source key. The attributes written to the destination key register may only indicate that the new key is a device specific secret key if the source key register attributes indicated the source key was a device specific secret key. If the destination attributes indicate the key can be used with particular cryptographic scheme (e.g., AES, ECC, etc.) the generated key is made to be compatible with indicated scheme.

Encrypt using AES. Inputs: encryption key register identifier, AES mode, length of data, pointer to plaintext source, pointer to ciphertext destination, initial value (if needed). Notes: This operation uses the key in the specified key slot to perform an AES encryption operation in the specified mode. This is an AES engine command. This operation is only performed if attributes in the encryption key register indicate this operation is allowed for the encryption key. If the encryption key attributes specify that only a certain type of AES mode (e.g., 256 AES) must be used, then only that type of operation is permitted.

Decrypt using AES. Inputs: encryption key register identifier, AES mode, length of data, pointer to plaintext source, pointer to ciphertext destination, initial value (if needed). Notes: This operation uses the key in the specified key slot to perform an AES encryption operation in the specified mode. This is an AES engine command. This operation is only performed if attributes in the encryption key register indicate this operation is allowed for the encryption key. If the encryption key attributes specify that only a certain type of AES mode must be used, then only that type of operation is permitted. Examples of AES modes include, but are not limited to CBC, CTR, XTS, etc.

Derive an ECC public key. Input: key register identifier storing an ECC private key. Output: ECC public key. Notes: This operation applies the appropriate ECC operation on the ECC Private key in the specified key slot to generate the corresponding ECC public key and returns the ECC public key. The attributes in the source key register must specify that the source key may be used for ECC signing or that elliptic-curve Diffie-Hellman exchange is allowed or the operation will not be performed.

Sign a PCR using ECC. Input: signing key register identifier, PCR register identifier, input value. Output: ECDSA signature. Notes: This operation uses the specified signing ECC private key to sign a SHA hash of the concatenation of the specified PCR value, and the input value. The attributes in the signing key register must indicate that the signing key may be used for ECC signing and that a PCR value must be included when ECC signing.

ECC Sign. Inputs: signing key register identifier, input value. Output: ECDSA signature. This operation uses the specified signing ECC private key to sign a SHA hash of the input value. The attributes in the signing key register must specify that the signing key may be used for ECC signing. If the attributes indicate that and that a PCR value must be included when ECC signing this operation will not be permitted.

Perform elliptic-curve Diffie-Hellman key exchange using PCR value. Inputs: ECC private key register identifier, PCR register identifier, destination register identifier, public key value, destination attributes. Notes: This operation uses the key in the specified register private key to perform elliptic-curve Diffie-Hellman key exchange with the supplied public key. The resulting elliptic-curves point's coordinates are concatenated with the PCR value from the specified PCR slot number, and the provided destination attributes to form a key which is placed into the destination key register. The destination attributes are placed in the destination key slot attribute field. This operation is only performed if the attributes of the ECC private key allow it to be used for elliptic-curve Diffie-Hellman key exchange. This operation does not allow the attributes stored in the destination key register to indicate the key is a device specific secret key.

Perform elliptic-curve Diffie-Hellman key exchange. Inputs: ECC private key register identifier, destination register identifier, public key value, destination attributes. Notes: This operation uses the key in the specified register private key to perform elliptic-curve Diffie-Hellman key exchange with the supplied public key. The resulting elliptic-curves point's coordinates are concatenated with the provided destination attributes and then a SHA is performed on the concatenation to generate a key which is placed into the destination key register. The destination attributes are placed in the destination key slot attribute field. This operation is only performed if the attributes of the ECC private key allow it to be used for elliptic-curve Diffie-Hellman key exchange. This operation does not allow the attributes stored in the destination key register to indicate the key is a device specific secret key.

As described herein, attribute indicators stored in attribute portions 131b-135b may affect, or prevent, operations that processing circuitry 110 performs on, or using, the keys stored in respective key portions 131a-135a. FIG. 3A-3G are notional diagrams of key attributes affecting operations that may be securely performed by cryptographic key management system 100.

Figure 3A:
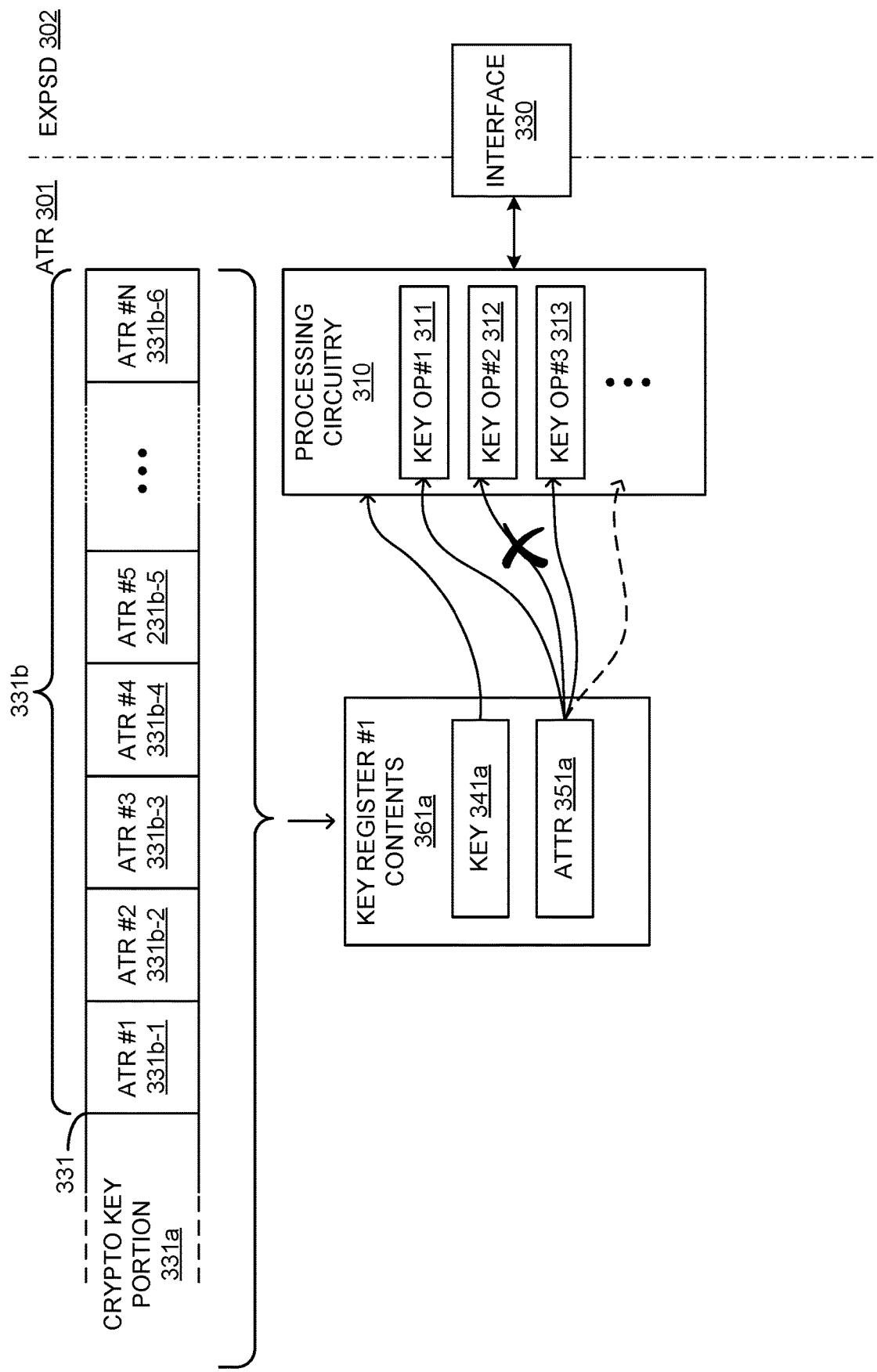
FIG. 3A-3E are notional diagrams of key attributes affecting operations that may be securely performed by a cryptographic key management system.

In an embodiment, the attribute indicators stored attribute portions 131b-135b determine a respective subset of operations that processing circuitry 110 is allowed to perform using the associated cryptographic key values stored in the corresponding cryptographic key portions 131a-135a. This is illustrated notionally in FIG. 3A. In FIG. 3A, the contents of key register 331 are read inside of ATR 301. These contents include a key 341a and attributes 351a. Attributes 351a may allow or disallow certain operations by processing circuitry 310. This is illustrated in FIG. 3A by the arrows running from attributes 351a to key operations 311-313 inside processing circuitry 310. The "X" on the arrow running from attributes 351a to key operation #2 312 illustrates the disallowance of key operation by attributes 351a. The lack of an "X" on the arrows between attributes 351a and key operation 311 and key operation 312 illustrate the allowance of key operation 311 and 313.

Figure 3B:
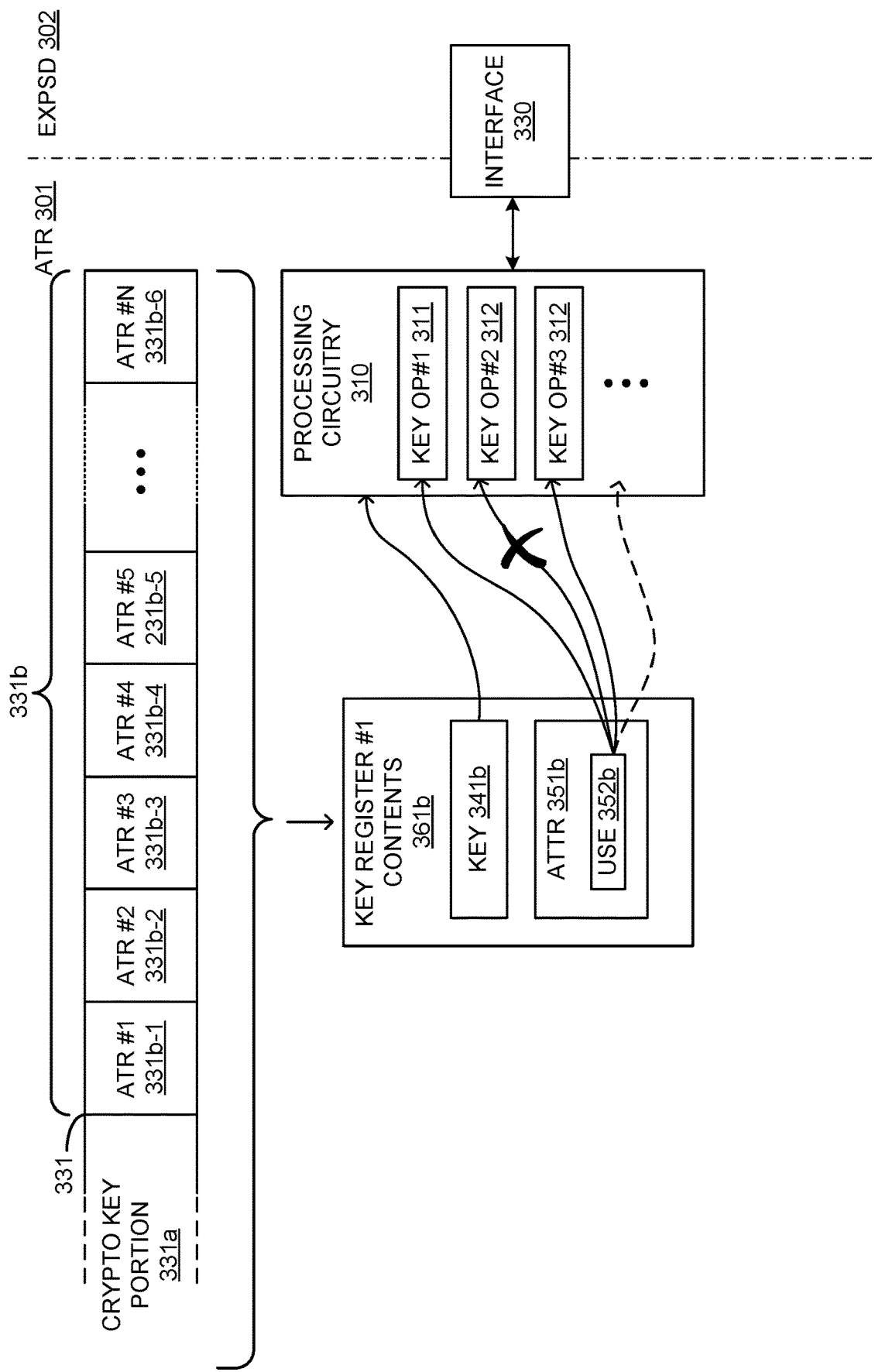

In an embodiment, the attribute indicators stored attribute portions 131b-135b correspond to an intended use of the key values stored in the corresponding cryptographic key portions 131a-135a. This intended use may determine a respective subset of operations that processing circuitry 110 is allowed to perform using the associated cryptographic key values stored in the corresponding cryptographic key portions 131a-135a. This is illustrated notionally in FIG. 3B. In FIG. 3B, the contents of key register 331b are read inside of ATR 301. These contents include a key 341b and attributes 351b. Attributes 351b include a use 352b. Attributes 351b, and use indicator 352b may allow or disallow certain operations by processing circuitry 310. This is illustrated in FIG. 3B by the arrows running from use indicator 352b to key operations 311-313 inside processing circuitry 310. The "X" on the arrow running from use indicator 352b to key operation #2 312 illustrates the disallowance of key operation by use indicator 352b. The lack of an "X" on the arrows between use indicator 352b and key operation 311 and key operation 312 illustrate the allowance of key operation 311 and 313 by use indicator 352b.

Figure 3C:
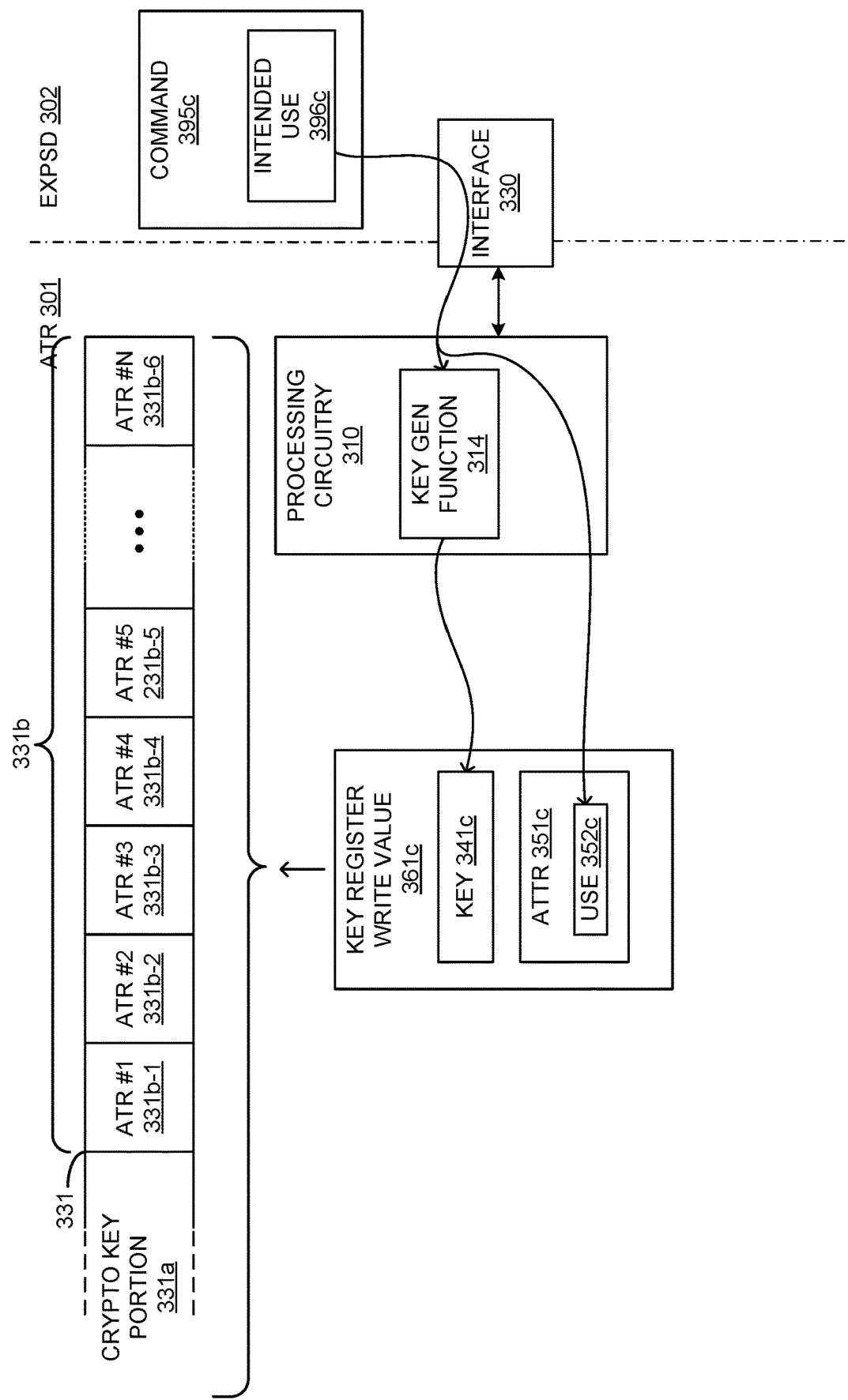

In an embodiment, one or more attribute indicators that indicate an intended use of the corresponding cryptographic key is determined in response to commands received via interface 130 that instruct processing circuitry 110 to calculate a corresponding cryptographic key. This is illustrated notionally in FIG. 3C. In FIG. 3C, one or more commands 395c that include information 396c about an intended use for the generated key are provided to interface 330 for provision to processing circuitry 310. In response, processing circuitry 310 generates a key 341c using key generator circuitry 314 and also sets one or more use attributes 352c to indicate an intended use. Generated key 341c and attributes 351c with use attributes 352c are combined into a key register write value 361c that is written to key register 331.

Figure 3D:
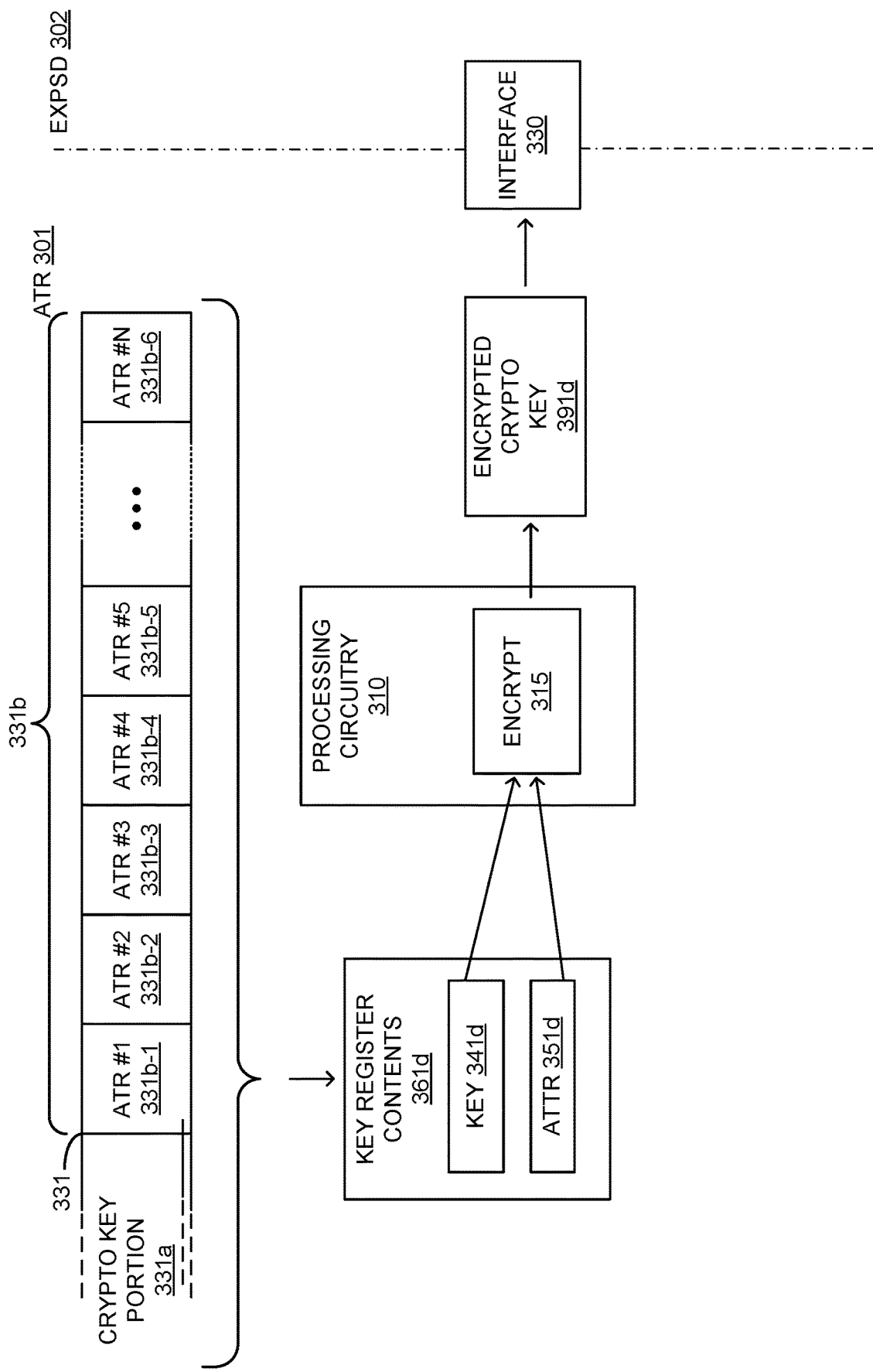

In an embodiment, based on one or more commands received via interface 130, a cryptographic key is exported via interface 130 in an encrypted form where the encrypted block holding the cryptographic key is generated based on both cryptographic key being exported and at least one attribute indicator. In an embodiment, the encrypted block holding the cryptographic key is generated based on both cryptographic key being exported and all of the attribute indicators. This operation is illustrated notionally in FIG. 3D. In FIG. 3D, contents 361d (which includes key 341d and attributes 351d) of key register 331 are provided to encryption circuitry 315 of processing circuitry 310. Encryption circuitry 315 generates an encrypted version 391d of key 341d based on both key 341d and attributes 351d. Encrypted version 341d is provided to interface 330 for export to exposed circuitry 302.

Figure 3E:
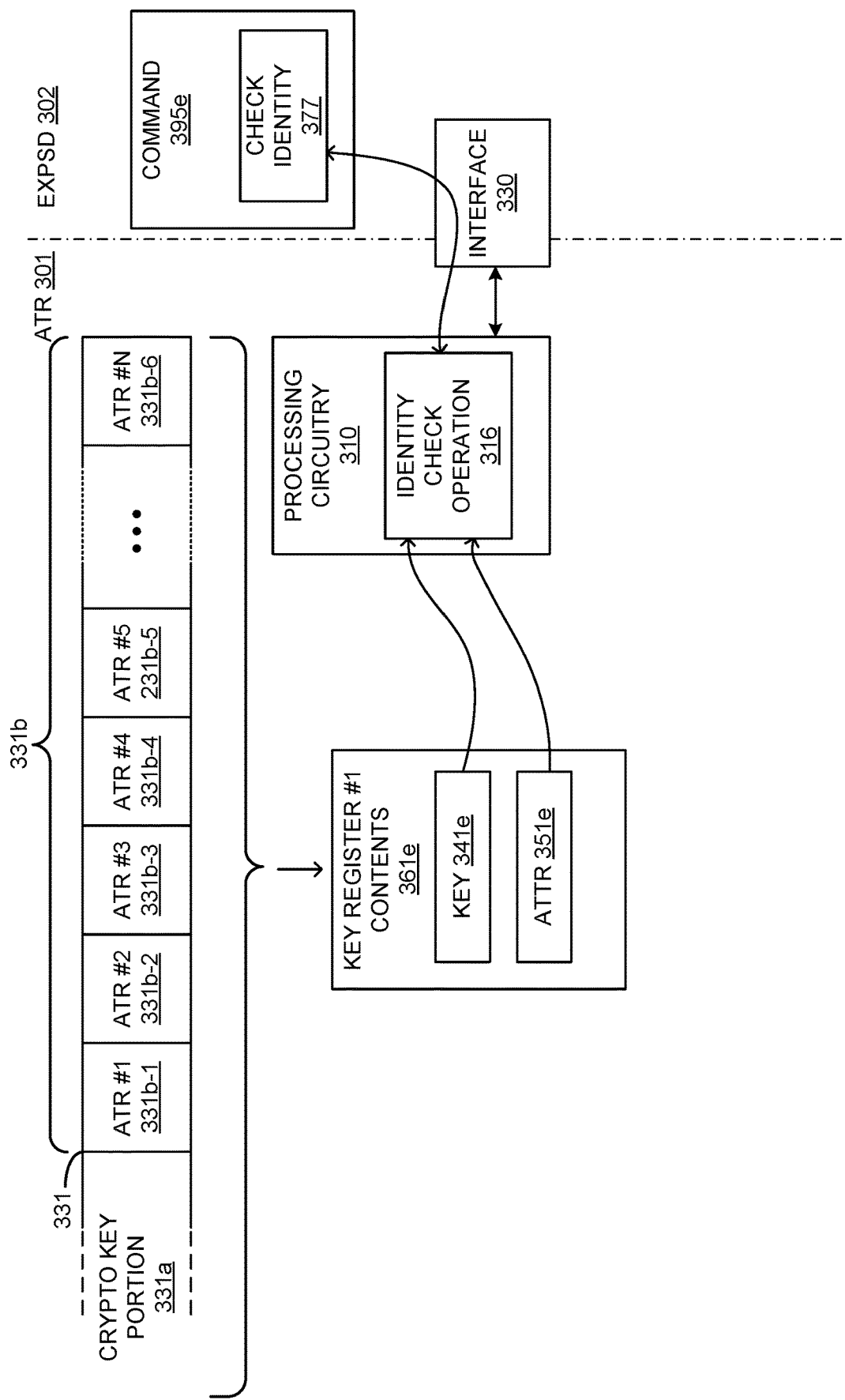

In an embodiment, a unique identity of cryptographic management system 100 may be established using cryptographic operations that are based on at least a cryptographic key stored in a key register 131-135 and associated attributes. This is illustrated notionally in FIG. 3E. In FIG. 3E, one or more commands 395e are provided to interface 330 for provision to processing circuitry 310. These commands 395 include commands 377 to establish the identity of ATR 301 using the key 341e and attributes 351e stored in key register 331. In response, contents 361e (which includes key 341e and attributes 351e) of key register 331 are provided to identity check operation 316 of processing circuitry 310. Identity check operation 316 processes key 341e, attributes 351e and information provided by check identity command 377 to provide a response, via interface 330, that establishes the identity of ATR circuitry 301 to exposed circuitry 302. An example embodiment of the identity check operation is to ECC Sign a check identity nonce 377 received in the command 395e. In such a case, key 341e may be an ECC private key that is used to perform the ECC Sign operation in block 316. In order for exposed circuitry 302 to verify the identity of the ATR circuitry 301, the corresponding ECC public key associated with 341e must be signed into some form of certificate during the manufacturing of ATR circuitry 301. This enables the receiver of the check identity response (e.g., exposed circuitry 302) to verify the ECC signature and confirm that it is talking to a valid ATR circuit 301. Another requirement for check identity to work is that the ATR circuit 301 must be able to create the same key 361e on every boot cycle. Thus, ATR circuitry 301 uses at least one root key that is used to derive 361e. This at least one root key comes initially from nonvolatile storage (e.g., NVRAM or fuses) the ATR circuitry 301 starts up. This enables the same value for key 361e to be derived over all boot sessions.

An example set of key attribute bits is given in Table 1.

TABLE 1

| Example pneumonic | Description |
| --- | --- |
| IsDeviceSecret | This attribute indicates whether the associated key is unique and secret to an individual ATR circuitry 101 instance. ATR circuitry 101 ensures no party (e.g., exposed circuitry 102) other than this instance of ATR circuitry 101 has or can have knowledge of this key. |
| SendKeyAllowed | This attribute indicates whether a "Send a key to hardware accelerator" operation (or its equivalents) can/will be performed by ATR circuitry 101 using this key. |
| LoadKeyAllowed | This attribute indicates whether a "Load a key from an encrypted key data block" operation (or its equivalents) can/will be performed by ATR circuitry 101 using this key. |
| StoreKeyAllowed | This attribute indicates whether a "Generate an encrypted key data block from provided key and attributes" operation, the "Generate an encrypted key data block from key register" (or their equivalents) can/will be performed by ATR circuitry 101 using this key. |
| SaveKeyAllowed | This attribute indicates whether a "Generate an encrypted key data block from key register" operation (or its equivalents) can/will be performed by ATR circuitry 101 using this key. |
| KDFKeyAllowed | This attribute indicates whether a "Derive a key from a key" operation (or its equivalents) can/will be performed by ATR circuitry 101 using this key. |
| KDFPCRAllowed | This attribute indicates whether a "Derive a key from a PCR value" operation (or its equivalents) can/will be performed by ATR circuitry 101 using this key. |
| ECCSignAllowed | This attribute indicates whether a "ECC Sign" operation (or its equivalents) can/will be performed by ATR circuitry 101 using this key. |
| ECDHAllowed | This attribute indicates whether a "Perform elliptic-curve Diffie-Hellman key exchange" operation (or its equivalents) can/will be performed by ATR circuitry 101 using this key. |

TABLE 1-continued

| Example pneumonic | Description |
|---|---|
| MustAppendPCR | This attribute indicates whether a "ECC Sign" (or its equivalents) operation using this key will include a PCR into the calculation of the digest that is signed. |
| AESEncryptAllowed | This attribute indicates whether an "Encrypt using AES" operation (or its equivalents) can/will be performed by ATR circuitry 101 using this key. |
| AESDecryptAllowed | This attribute indicates whether an "Decrypt using AES" operation (or its equivalents) can/will be performed by ATR circuitry 101 using this key. |
| UseAs256BitKey | Each key slot may hold, for example, 256 bits of key in its key portion. This attribute determines whether the full number bits (e.g., 256) are used as key to perform operations (e.g., AES-256.) When attribute does not require the full number of bits, a lesser number (e.g., 128) of bits of the key can be used as the key for operations (e.g., AES-128.) |
| AESXTSOnly | This attribute indicates whether the key can only be used to perform AES operations in AES-XTS mode. No other AES modes are allowed. Otherwise, all AES modes are allowed. |

Figure 4:
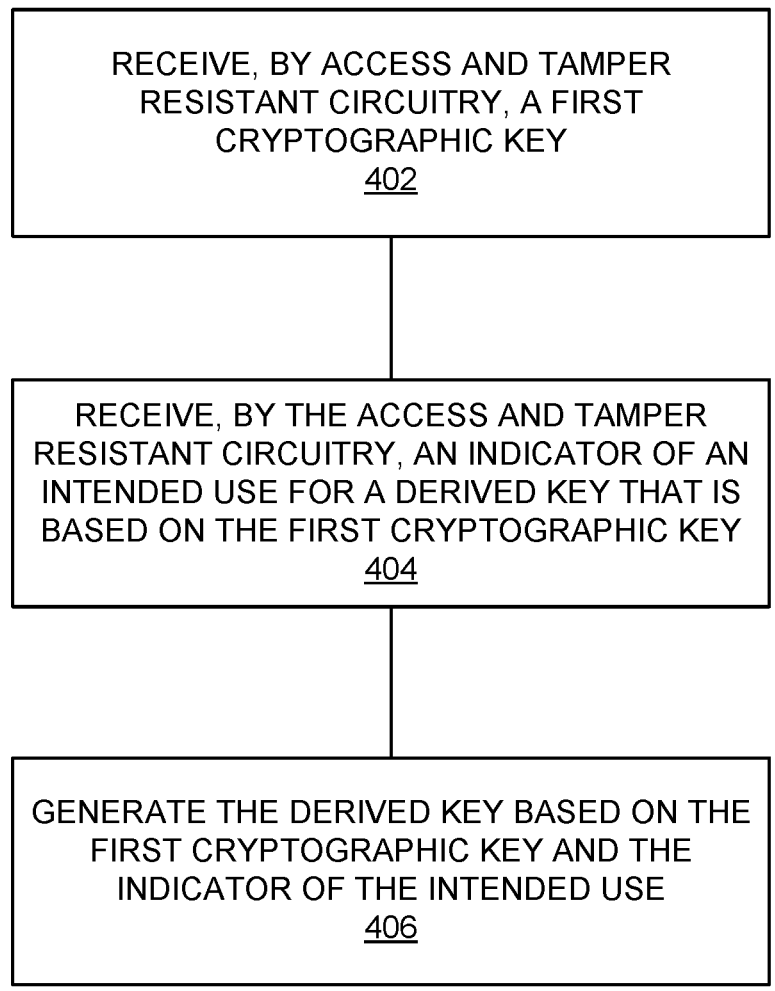
FIG. 4 is a flowchart of a method of operating a cryptographic key management system with key attributes.

FIG. 4 is a flowchart of a method of operating a cryptographic key management system with key attributes. The steps illustrated in FIG. 4 may be performed by one or more elements of cryptographic key management system 100. By access and tamper resistant circuitry, a first encryption key is received (402). For example, key values stored in cryptographic key portions 131a-135a may be received by cryptographic key registers 131-135. These key values may be generated by ATR 102. These key values may be received via interface 130 from exposed circuitry 102.

By the access and tamper resistant circuitry, an indicator of an intended use for a derived key that is based on the first cryptographic key is received (404). For example, attributes that are to be associated with a key derived from a key stored in key portion 131a may be based at least in part on the attributes read from the contents of the attributes in attribute portion 131b, where the attributes in attribute portion 131b indicate an intended use of the key stored in key portion 131a.

The derived key is generated based on the first cryptographic key and the indicator of the intended use 406). For example, processing circuitry 110 may, based on both the key value in key portion 131a and the attributes in attribute portion 131b, derives a key using key derivation function circuitry. This derived key and its associated set of attributes may be combined into a key register write value that is written to key register 132. In an embodiment, the attributes that are associated with the derived key may be based at least in part on the attributes read from the attribute portion 131b. In an embodiment, the attributes that are associated with the derived key may be based at least in part on attributes received from exposed circuitry 102.

Figure 5:
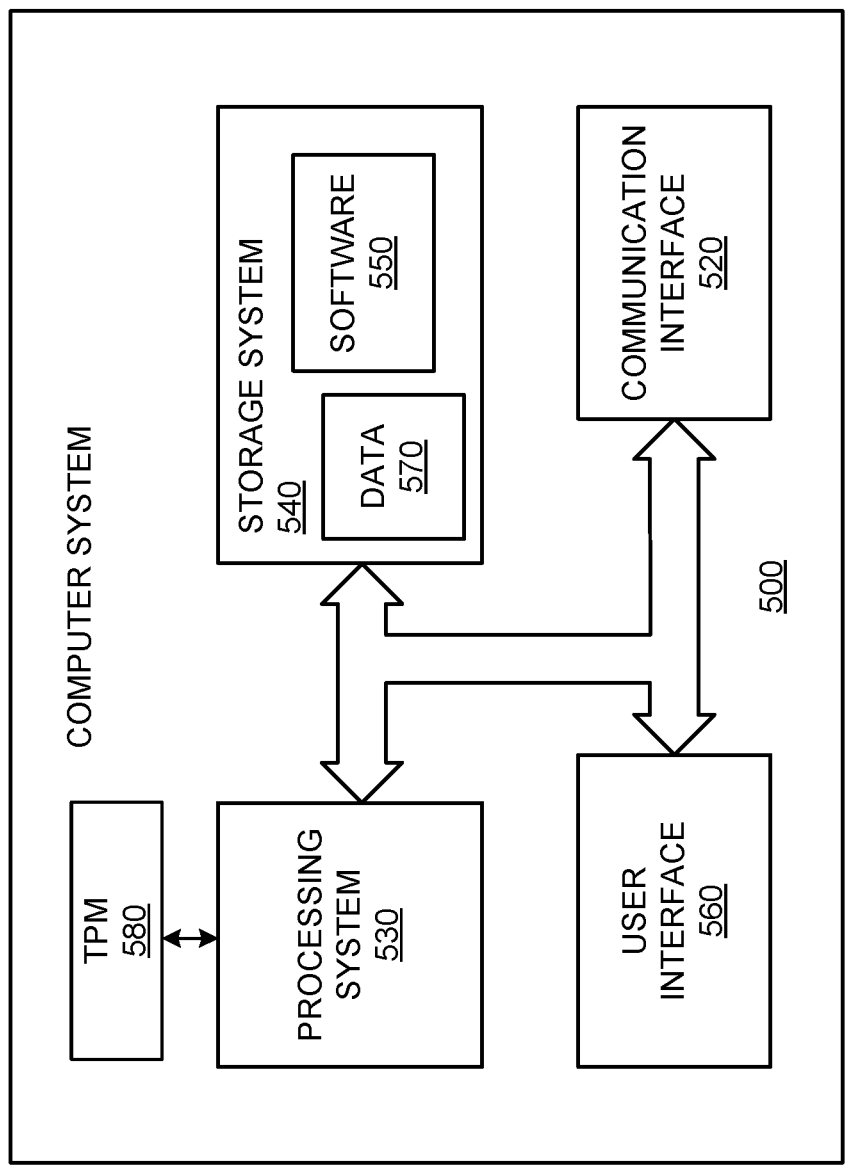
FIG. 5 is a block diagram of a computer system.

FIG. 5 is a block diagram of a computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein.

Devices, circuits, and systems described herein may be implemented using computer-aided design tools available in the art, and embodied by computer-readable files containing software descriptions of such circuits. This includes, but is not limited to one or more elements of system 100, and/or its components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

The functionally described herein can be performed, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 5 illustrates a block diagram of an example computer system. In an embodiment, computer system 500 and/or its components include circuits, software, and/or data that implement, or are used to implement, the methods, systems and/or devices illustrated in the Figures, the corresponding discussions of the Figures, and/or are otherwise taught herein.

Computer system 500 includes communication interface 520, processing system 530, storage system 540, user interface 560, and trusted platform module (TPM) 580. ATR circuitry 102 may be included in TPM 580. ATR circuitry 102 may be included in Processing system 530. Processing system 530 is operatively coupled to storage system 540. Storage system 540 stores software 550 and data 570. Processing system 530 is operatively coupled to communication interface 520 and user interface 560. Processing system 530 may be an example of processing system 100, and/or its components.

Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-580.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

A cryptographic key management system, comprising: processing circuitry to perform cryptographic processing based at least in part on a first cryptographic key; a plurality of cryptographic key registers, the plurality of cryptographic key registers including cryptographic key portions to store cryptographic keys and attribute portions to store respective pluralities of attribute indicators that are associated with corresponding cryptographic keys stored in the cryptographic key portions, the plurality of cryptographic key registers including a first cryptographic key register that includes a first cryptographic key portion to store the first cryptographic key and a first attribute portion to store a first set of attribute indicators associated with the first cryptographic key; an interface to receive commands that control the processing circuitry to perform cryptographic processing based at least in part on the first cryptographic key and the first set of attribute indicators.

Example 2

The system of example 1, wherein the cryptographic key portions of the cryptographic key registers are not writable in response to commands received via the interface without also writing the corresponding attribute portion.

Example 3

The system of example 1, wherein the cryptographic key portions of the cryptographic key registers are not readable, in response to commands received via the interface, in unencrypted form.

Example 4

The system of example 1, wherein the attribute portions of the cryptographic key registers are readable via the interface and in response to commands received via the interface, in unencrypted form.

Example 5

The system of example 1, wherein, based on one or more commands received via the interface, the first encryption key and the first set of attributes are to be written to the first cryptographic key register.

Example 6

The system of example 1, wherein, based on one or more commands received via the interface, a randomly generated cryptographic key and an associated set of attributes are to be written to the first cryptographic key register, the randomly generated cryptographic key to be generated by the processing circuitry.

Example 7

The system of example 1, wherein, based on one or more commands received via the interface, a derived cryptographic key and an associated set of attributes are to be written to a second cryptographic key register, the derived cryptographic key being generated by the processing circuitry based at least in part on the first cryptographic key stored in the first cryptographic key register.

Example 8

The system of example 1, wherein, based on one or more commands received via the interface, a second cryptographic key and associated set of attributes from an encrypted cryptographic data block are to be written to a second cryptographic key register.

Example 9

The system of example 1, wherein at least a first one of the first set of attribute indicators specifies whether the first cryptographic key is unique among other cryptographic key management systems.

Example 10

The system of example 9, wherein, the attribute indicators cannot specify an associated cryptographic key is unique if the associated cryptographic key is based on an external cryptographic key received via the interface.

Example 11

The system of example 1, further comprising: a plurality of platform configuration registers.

Example 12

The system of example 11, wherein values stored in the plurality of platform configuration registers are readable via the interface and in response to commands received via the interface, and the values stored in the plurality of platform configuration registers are not writable with values received via the interface.

Example 13

The system of example 11, each of the plurality of platform configuration registers initialize to different values.

Example 14

A cryptographic key management system, comprising: an interface to receive commands that control cryptographic key processing circuitry to perform a set of operations on a set of cryptographic keys; a plurality of cryptographic key registers that are readable and writable by the cryptographic key processing circuitry, the plurality of cryptographic key registers including cryptographic key portions to store cryptographic keys and attribute portions to store corresponding pluralities of attribute indicators that are associated with the cryptographic keys stored in the cryptographic key portions; the attribute indicators to determine a respective subset of operations that the cryptographic key processing circuitry is allowed to perform using the cryptographic keys stored in the corresponding cryptographic key portion.

Example 15

The system of example 14, wherein one or more of the attribute indicators indicate an intended use of the cryptographic key.

Example 16

The system of claim 15, wherein the one or more of the attribute indicators that indicate an intended use of the corresponding cryptographic key is determined in response to commands received via the interface that instruct the cryptographic key processing circuitry to calculate the corresponding cryptographic key.

Example 17

The system of example 14, wherein, based on one or more commands received via the interface, a first cryptographic key is to be exported via the interface in an encrypted form wherein an encrypted version of the first cryptographic key is to be generated based on at least the first cryptographic key and the at least a first attribute indicator.

Example 18

The system of example 14, wherein a unique identity of the cryptographic key management system is to be established using cryptographic operations based on at least a first cryptographic key and a first attribute indicator.

Example 19

The system of example 14, further comprising: a plurality of platform configuration registers.

Example 20

The system of example 19, wherein new values stored in the plurality of platform configuration registers are to be derived, from current values stored in the respective platform configuration register and at least one input value, using a cryptographic hash function.

Example 21

The system of example 19 wherein a second cryptographic key is to be derived from at least a first cryptographic key, a plurality of attribute indicators corresponding to the first cryptographic key, and a value stored in a platform configuration register.

Example 22

A method for deriving a cryptographic key, comprising: receiving a first cryptographic key; receiving an indicator of an intended use for a derived cryptographic key; and, generating the derived cryptographic key based on the first cryptographic key and the indicator of the intended use.

Example 23

The method of example 22, wherein the derived key is based on a cryptographic hash function having an input that includes at least the first cryptographic key and the indicator of the intended use.

Example 24

The method of example 22, wherein the derived key is to be associated with a first uniqueness indicator that cannot be set to indicate the derived key is unique unless the first cryptographic key is associated with a second uniqueness indicator that indicated the first cryptographic key is unique.

Example 25

The method of example 22, wherein the derived key is further based on a value in a platform configuration register.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A cryptographic key management system, comprising:
   processing circuitry to perform cryptographic processing based at least in part on a first cryptographic key, the processing circuitry comprising an access and tamper resistant circuit block configured to prevent key values of keys stored within the access and tamper resistant circuit block from being exposed outside of the access and tamper resistant circuit block;

a plurality of cryptographic key registers located within the access and tamper resistant circuit block, the plurality of cryptographic key registers including cryptographic key portions to store cryptographic keys and attribute portions to store respective pluralities of attribute indicators that are associated with corresponding cryptographic keys stored in the cryptographic key portions, the plurality of cryptographic key registers including a first cryptographic key register that includes a first cryptographic key portion to store the first cryptographic key and a first attribute portion to store a first set of attribute indicators associated with the first cryptographic key; and an interface to receive commands that control the processing circuitry to perform cryptographic processing based at least in part on the first cryptographic key and the first set of attribute indicators, wherein one or more attribute indicators of the first set of attribute indicators each indicates an allowable key derivation operation for the first cryptographic key, and wherein the access and tamper resistant circuit block is configured to prevent any modification of the attribute portions after key generation.

2. The system of claim 1, wherein the cryptographic key portions of the cryptographic key registers are not writable in response to commands received via the interface without also writing the corresponding attribute portion.

3. The system of claim 1, wherein the cryptographic key portions of the cryptographic key registers are not readable, in response to commands received via the interface, in unencrypted form.

4. The system of claim 1, wherein the attribute portions of the cryptographic key registers are readable via the interface and in response to commands received via the interface, in unencrypted form.

5. The system of claim 1, wherein, based on one or more commands received via the interface, the first cryptographic key and the first set of attributes are to be written to the first cryptographic key register.

6. The system of claim 1, wherein, based on one or more commands received via the interface, a randomly generated cryptographic key and an associated set of attributes are to be written to the first cryptographic key register, the randomly generated cryptographic key to be generated by the processing circuitry.

7. The system of claim 1, wherein, based on one or more commands received via the interface, a derived cryptographic key and an associated set of attributes are to be written to a second cryptographic key register, the derived cryptographic key being generated by the processing circuitry based at least in part on the first cryptographic key stored in the first cryptographic key register.

8. The system of claim 1, wherein, based on one or more commands received via the interface, a second cryptographic key and associated set of attributes from an encrypted cryptographic data block are to be written to a second cryptographic key register.

9. The system of claim 1, wherein at least a first one of the first set of attribute indicators specifies whether the first cryptographic key is unique among other cryptographic key management systems.

10. The system of claim 9, wherein, the attribute indicators cannot specify an associated cryptographic key is unique if the associated cryptographic key is based on an external cryptographic key received via the interface.

11. The system of claim 1, further comprising:
a plurality of platform configuration registers, wherein values stored in the plurality of platform configuration registers are readable via the interface and in response to commands received via the interface, and the values stored in the plurality of platform configuration registers are not writable with values received via the interface, and wherein each of the plurality of platform configuration registers initialize to different values.

12. A cryptographic key management system, comprising:
an interface to receive commands that control cryptographic key processing circuitry to perform a set of operations on a set of cryptographic keys, the cryptographic key processing circuitry comprising an access and tamper resistant circuit block;

a plurality of cryptographic key registers located within the access and tamper resistant circuit block that are readable and writable by the cryptographic key processing circuitry, the plurality of cryptographic key registers including cryptographic key portions to store cryptographic keys and attribute portions to store corresponding pluralities of attribute indicators that are associated with the cryptographic keys stored in the cryptographic key portions, the plurality of cryptographic key registers including a first cryptographic key register configured to store a first cryptographic key and a first set of attribute indicators corresponding to the first cryptographic key, wherein the first set of attribute indicators comprises one or more attribute indicators each configured to indicate an allowable key derivation operation that the cryptographic key processing circuitry is allowed to perform using the cryptographic keys stored in the corresponding cryptographic key portion, and wherein the access and tamper resistant circuit block is configured to prevent any modification of the attribute portions after storing the attribute portions with the corresponding cryptographic keys within the access and tamper resistant circuit block at key generation.

13. The system of claim 12, wherein one or more of the attribute indicators indicate an intended use of the cryptographic key.

14. The system of claim 13, wherein the one or more of the attribute indicators that indicate an intended use of the corresponding cryptographic key is determined in response to commands received via the interface that instruct the cryptographic key processing circuitry to calculate the corresponding cryptographic key.

15. The system of claim 12, wherein, based on one or more commands received via the interface, a first cryptographic key is to be exported via the interface in an encrypted form wherein an encrypted version of the first cryptographic key is to be generated based on at least the first cryptographic key and the at least a first attribute indicator.

16. The system of claim 12, wherein a unique identity of the cryptographic key management system is to be established using cryptographic operations based on at least a first cryptographic key and a first attribute indicator.

17. The system of claim 12, further comprising:
a plurality of platform configuration registers, wherein new values stored in the plurality of platform configuration registers are to be derived, from current values stored in the respective platform configuration register and at least one input value, using a cryptographic hash function, and wherein a second cryptographic key is to be derived from at least a first cryptographic key, a plurality of attribute indicators corresponding to the first cryptographic key, and a value stored in a platform configuration register.

18. A method for deriving a cryptographic key, comprising:
   receiving a first cryptographic key and first attribute indicators associated with the first cryptographic key;
   receiving an indicator of an intended use for a derived cryptographic key;
   within an access and tamper resistant circuit block of cryptographic key processing circuitry, generating the derived cryptographic key based on the first cryptographic key, one or more of the first attribute indicators each indicating an allowable key derivation operation for the first cryptographic key, and the indicator of the intended use; and
   generating an attribute portion comprising attribute indicators associated with the derived cryptographic key, the attribute portion stored with the derived cryptographic key within the access and tamper resistant circuit block, the access and tamper resistant circuit block configured to prevent any modification of the attribute portion after generating the attribute portion.

19. The method of claim 18, wherein the derived cryptographic key is based on a cryptographic hash function, the cryptographic hash function having an input that includes at least the first cryptographic key and the indicator of the intended use.

20. The method of claim 18, wherein the derived cryptographic key is to be associated with a first uniqueness indicator that cannot be set to indicate the derived cryptographic key is unique unless the first cryptographic key is associated with a second uniqueness indicator that indicated the first cryptographic key is unique.

* * * * *